United States Patent
Iwane

(10) Patent No.: US 8,218,943 B2
(45) Date of Patent: Jul. 10, 2012

(54) CV TAG VIDEO IMAGE DISPLAY DEVICE PROVIDED WITH LAYER GENERATING AND SELECTION FUNCTIONS

(75) Inventor: Waro Iwane, Sapporo (JP)

(73) Assignee: Iwane Laboratories, Ltd., Sapporo-Shi (JP)

( * ) Notice: Subject to any disclaimer, the term of this patent is extended or adjusted under 35 U.S.C. 154(b) by 395 days.

(21) Appl. No.: 12/448,611

(22) PCT Filed: Dec. 26, 2007

(86) PCT No.: PCT/JP2007/075020
§ 371 (c)(1),
(2), (4) Date: Jul. 16, 2009

(87) PCT Pub. No.: WO2008/078790
PCT Pub. Date: Jul. 3, 2008

(65) Prior Publication Data
US 2010/0061701 A1    Mar. 11, 2010

(30) Foreign Application Priority Data
Dec. 27, 2006  (JP) .................. 2006-351698

(51) Int. Cl.
H04N 9/80  (2006.01)
H04N 5/77  (2006.01)
H04N 5/225  (2006.01)

(52) U.S. Cl. ........ 386/248; 386/223; 386/224; 386/242; 348/218.1

(58) Field of Classification Search .................. None
See application file for complete search history.

(56) References Cited

U.S. PATENT DOCUMENTS
6,690,883 B2 * 2/2004 Pelletier ..................... 396/321
2008/0221843 A1 * 9/2008 Shenkar et al. ................. 703/1

FOREIGN PATENT DOCUMENTS
| JP | H09-319896 A | 12/1997 |
| JP | 2001-05764 A | 1/2001 |
| JP | 2002-304537 A | 10/2002 |
| JP | 2003-287434 A | 10/2003 |
| JP | 2006-053694 A | 2/2006 |

\* cited by examiner

OTHER PUBLICATIONS

"Camera Position Estimation Between Real Image and 3D Map"; Tohru Irie, Kouhei Tou, and Masashi Uchinoumi; Dept. of R&D of GEO Technical Laboratory Co., Ltd., Hakata Gion Bldg, 1-1 Gionmachi Hakata-ku, Fukuoka, 812-0038, Japan; IPSJ SIG Technical Report, 2004-CG-117 (15), Nov. 27, 2004.

*Primary Examiner* — William C Vaughn, Jr.
*Assistant Examiner* — Heather Jones
(74) *Attorney, Agent, or Firm* — Manabu Kanesaka

(57) ABSTRACT

Under an internet environment, video images of actual roads, stores or the like are distributed, an arbitrary tag can be attached to the video images or information can be written in them and further a plurality of layers are set to the video images in the same area. An administrator device (200) stores a CV video image obtained by adding, to a video image of an arbitrary object area, a CV value indicating three-dimensional values of camera positions and attitudes during shooting, stores a CV tag which is displayed in a synthesized manner at an arbitrary designated position in the CV video image, generates a plurality of layers to be overlapped with the CV video image and having the same coordinate system as that of the CV video image, and stores the generated layers in association with the corresponding CV video images. A plurality of user devices (300) which are respectively connected with the administrator device (200) through an internet receive desired CV video images from the administrator device (200) for display, display a desired layer in the displayed CV video image in an overlapped manner, and synthesize and display the CV video image and the layer with a CV tag at a desirable position on a display (300*a*).

14 Claims, 23 Drawing Sheets

To a CV tag image display device provided with layer generating and selecting functions 100

FIG. 4
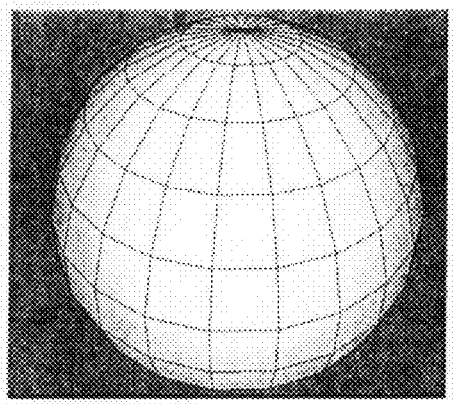
(a)
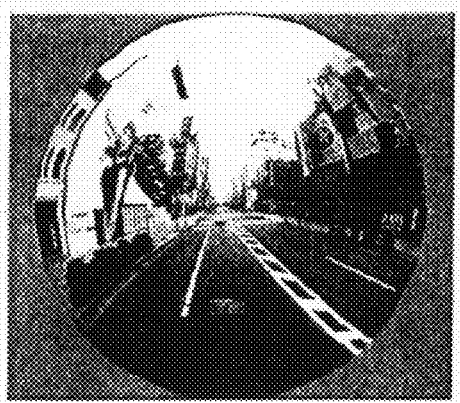
(b)
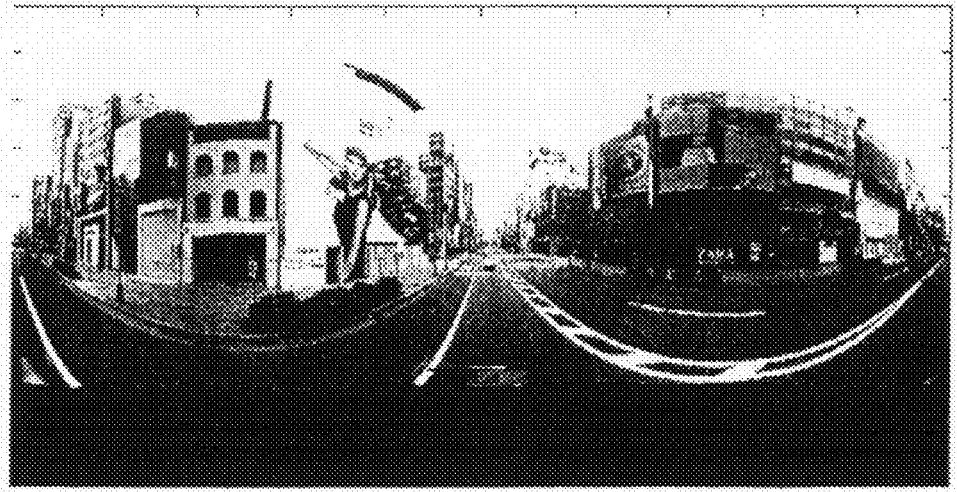
(c)

FIG. 6
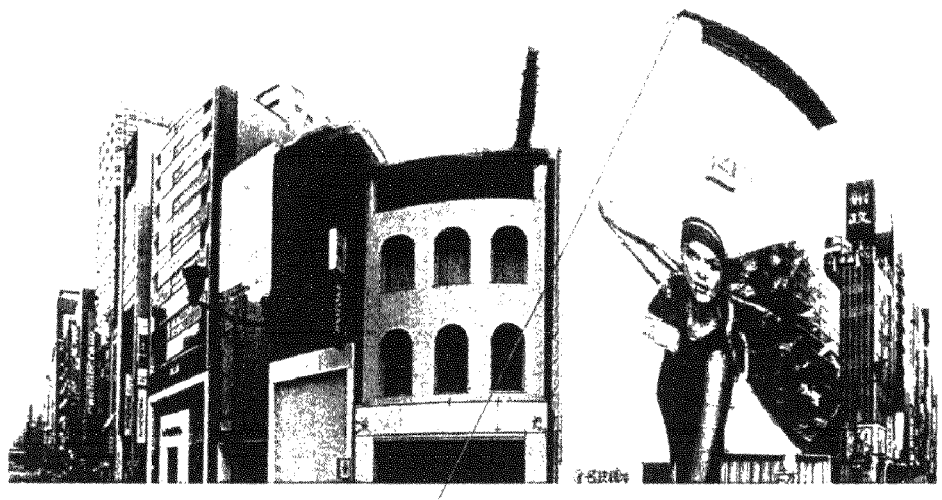

(a) Three-dimensional graph (b) View from the top (c) View from the side

Indication of a CV value

100: CV tag image display device provided with layer generating and selecting functions 100: CV tag video image display device provided with layer generating and selecting functions

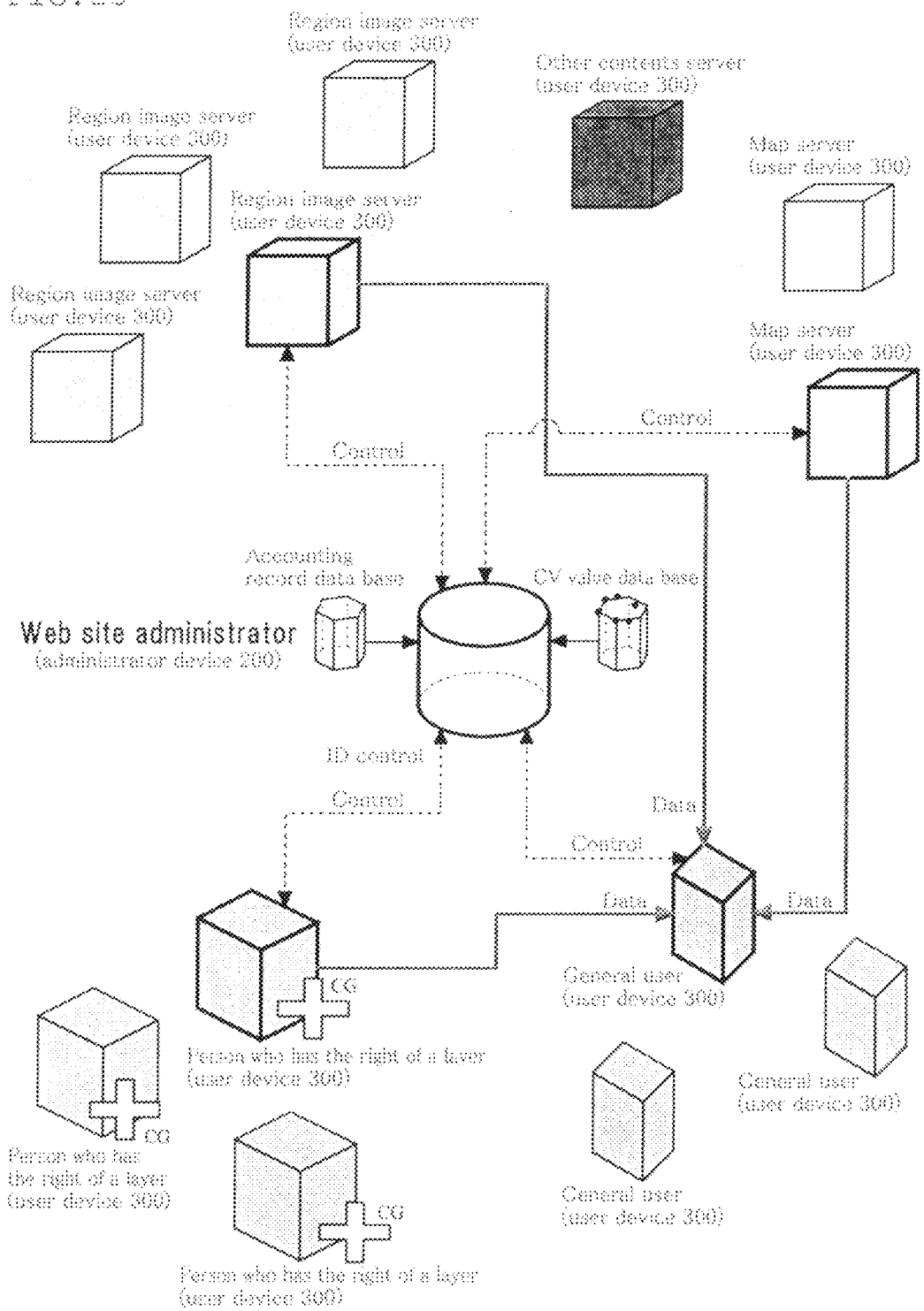

CV TAG VIDEO IMAGE DISPLAY DEVICE PROVIDED WITH LAYER GENERATING AND SELECTION FUNCTIONS

TECHNICAL FIELD

The present invention relates to a video image distribution and display device for managing and distributing video images under a network environment such as an internet and a LAN. In particular, the present invention relates to a CV tag video image display device having a next-generation user interface (UI) function based on images, which is provided with layer generating and selection functions and is capable of distributing video images of actual streets, roads, buildings, the inside and outside of stores, or the like, allows a user to attach a tag to or write information in an intended object in a video image, thereby realizing a direct access to the intended product in the video image, and allows a user to generate and select by himself or herself a plurality of layers classified according to contents attributes for a video image in the same area.

BACKGROUND ART

In recent years, commercial transactions and sales of merchandises utilizing an internet environment has been actively conducted. In the sales of merchandises utilizing an internet, buying and selling a merchandise is conducted by a method in which a seller of a merchandise registers in a server (an administrator device) a web page (a virtual store) showing photographs or detailed information of the merchandise, a purchaser who intends to buy a merchandise makes an access, from a personal computer (PC) at home, mobile terminals or the like (a user device), a server on which a web page is registered, visits virtual stores to see the photographs or data of merchandises, creates prescribed order data if he or she finds a merchandise he or she wishes to buy, and sends the created order data to the server, and the seller of the merchandise who receives the order data sends the ordered merchandise to the purchaser by a prescribed method, and settles the account by credit cards or bank or postal transfer (see Patent Document 1).

In such a commercial transaction via an internet, a provider of merchandises enjoys benefits that he or she does not require to set up actual stores or employ store clerks or the like, and can provide information on merchandises for 24 hours, whereby he or she can significantly curtail the expense and as a result, can supply merchandises at a lower cost. On the other hand, a purchaser of merchandises enjoys benefits that he or she can freely visit virtual stores on the internet at home without the need of going out, can freely order whichever he or she likes whenever he or she likes, and can purchase quickly more inexpensive merchandise. That is, such a commercial transaction utilizing an internet allows both a provider of merchandises and a purchaser of merchandises to be able to conduct more beneficial transactions. For this reason, with the popularization and expansion of an internet environment, this type of commercial transaction via an internet has been rapidly widespread in recent years.

In addition, such virtual stores using an internet are also advantageous for parties who provide a variety of merchandises and services, such as actual stores, department stores and restaurants, since they serve as a significantly effective advertising tool which urges people to visit actual stores.

In the case of merchandise or service providers who have their actual stores or firms, in a web page published on an internet, a map showing the location of actual stores or firms is normally displayed.

Therefore, a user who is interested in a specific merchandise or service on the web page at first confirms the map showing the location of a store or firm which provides this merchandise or the service, and then visits the nearest store or firm. Accordingly, the page effect, layout, easiness in seeing of a web page showing a map have become very important factors for urging people to visit actual stores.

Under such circumstances, as for a map showing the location of a store or the like, a technology has been proposed in which a web page which shows only a map in more detailed and in more understandable manner is displayed as a link. According to this technology, a displayed map can be enlarged or reduced at an arbitral magnification, or can be moved to a neighborhood area, whereby convenient map information can be provided for a user (see Patent Document 2).

Patent Document 1: JP-A-2002-304537
Patent Document 2: JP-A-2001-005764

However, shops and stores on an internet are nothing but virtual, and the information on them are provided basically in letters. Even though photographs and video images of merchandises or the like are shown, they are just annexed or additional information.

That is, the web world on an internet is a world of letters which is far away from the real life. A user does not feel the sense of distance. This is the advantage but also is the disadvantage of the web world.

Recently, there are communication sites which require membership enrollment. The above problem is applied also to these sites.

In the stores on the web which are based mainly on letters, users cannot see each other. Therefore, users cannot be intuitive in dealing. Users may lose credit in transaction, and crimes occur frequently. However, effective means capable of solving these problems have not yet been proposed.

The inventors of the present application made intensive studies. As a result, the inventors have found that, by automatically detect a sufficient number of feature points from a plurality of frame images of motion pictures of actual streets, roads, buildings, stores or the like, and automatically tracing the feature points between each frame, CV value data indicating the position and rotation angle of a camera used for shooting the motion pictures can be obtained with a high degree of accuracy.

In addition, the inventors have found that, by using a video image to which this CV value data has been added (CV video image), it is possible to detect three-dimensional coordinates of an object in the video image, attach a tag (CV tag) freely to these coordinates, and input information to this tag. The inventors have found that, by doing the above, an object can be selected while watching the video image, a position to which a tag (CV tag) is attached can be set freely in a video image of an object or in a three-dimensional space of the video image, and a posture can be set, moved, retrieved and deleted.

The inventors have further found that, by distributing a motion picture on a web, attaching a CV tag having an icon function which has been created by CG, conducting bi-directional communication through a tag as a medium, distributing on a web a more realistic CV video image (and/or a three-dimensional video image) or a video image which can be three dimensional, overlapping a three-dimensional tag which is integrated with the video image keeping a positional relationship with the video image, and providing a plurality of layers in which the tag is arranged, it is possible to create a plurality of worlds in which a user can freely generate, select and distribute layers, other users can select this tag, a bi-directional communication becomes possible not in the virtual reality created by CG but in the familiar image of the reality, and a CV tag can be utilized as the doorway of information as a more intuitive user interface.

That is, the present invention has been proposed to solve the above-mentioned problems associated with the conventional technologies, and an object thereof is to provide a CV tag video display device provided with layer generating and selecting functions which is capable of distributing a video image (CV video image) of actual streets, roads, buildings, the inside and outside of a store, allowing a user to attach a tag to or write information to an arbitral position in the video image (CV video image) as well as to set, in the video image (CV video image) in the same area, a plurality of layers which have been classified according to contents attributes, and providing a more realistic virtual space or virtual store, and therefore, is particularly suited to sales of merchandises or advertisement of stores or firms, providing town guide or map information utilizing an internet.

DISCLOSURE OF THE INVENTION

According to the first embodiment of the present application, in order to achieve the above-mentioned object, the CV tag image display device provided with layer generating and selecting functions of the present invention comprises an administrator device and one or two or more user devices which are communicatably connected with the administrator device through a network;

the administrator device comprises:

a CV video image storing means which stores a CV video image obtained by adding to a video image of an arbitrary object area a predetermined CV value indicating three-dimensional values of the position and posture of a camera during shooting;

a layer generating means which generates one or two or more layers which are to be overlapped with the CV video image and have the same coordinate system as that of the CV video image;

a layer storing means which stores the layer after relating it to a corresponding CV video image;

a CV tag inputting means which arranges a predetermined CV tag in an arbitral three-dimensional coordinates in a designated range of the layer;

a CV tag storing means which stores, together with the relevant information thereof, the CV tag which has been arranged for each layer;

a CV tag detecting means which detects and extracts the CV tag which has been arranged for each layer or the relevant information thereof, and distributes the detected and extracted CV tag or the relevant information thereof to the user device; and an ID administrating means which administrates all of the CV video images, layers, CV tags and relevant information within the CV tag, selects data required by the user device, combines the data, and distributes the data to the user device or records the data in the user device;

the user device which is connected with the administer device through a network according to an inputting operation of a user interface comprises:

a display which displays a predetermined image;

a CV video image selecting and displaying means which selects and receives a CV video image of a desired location among CV video images to be stored in the CV video image storing means of the administrator device and displays the selected and received CV video image on the display;

a layer selecting and integrating means which causes the layer generating means of the administrator device to generate a desired layer, or from the layers stored in the layer storing means, selecting a desired layer from a plurality of layers corresponding to the CV video image which has been selected by the CV video image selecting and displaying means and receiving the generated and selected layer to integrate the coordinates of the generated layer with the coordinates of the CV video image;

a CV tag selecting and displaying means which selects a CV tag arranged on the layer which has been selected by the layer selecting and integrating means, and integrating the selected CV tag on the layer of which the coordinates are integrated, thereby displaying the CV tag on the display together with the CV image in a synthesized manner; and a tag information selecting and displaying means which designates the CV tag which is displayed in a synthesized manner with the CV video image and allows the CV tag to be displayed on the display in such a manner that the relevant information of the CV tag can be edited, classified, integrated, retrieved, deleted or the like.

The CV tag video display device provided with layer generating and selecting functions with this configuration is capable of generating, in a video image of an arbitral street, a road, a store or the like, a CV video image to which a CV value indicating a three-dimensional position and posture of a camera which is used for shooting the video image is generated and the CV video image is then distributed through a network such as an internet so as to be displayed on each of user devices.

The CV video image is provided with three-dimensional coordinate data on an arbitral object in a video image. A tag (CV tag) can be freely attached to these coordinates.

As a result, for an arbitral object in a CV video image which has been distributed through a network, by attaching a CV tag which has information on a three-dimensional position and posture and selecting the CV tag, it is possible to display various data including attribute information, related information and additional information on the object to which the tag has been attached. A CV tag has three-dimensional information indicating the position and attitude in a CV video image, and can be freely arranged in a three-dimensional space of the image. Therefore, it is possible to arrange various tags freely in a number incomparable to the case in which marks are put on a two-dimensional map.

Furthermore, layers consisting of a CV video image, a CV tag or the like which has the same coordinate system as that of the CV image are generated so that they are overlapped with the CV video image, whereby a plurality of layers can be generated and displayed freely.

By publishing and providing on a web a CV video image according to the present invention, a web user can handle the CV video image three dimensionally. In addition, not only the provider of the image but also the user of the image can freely attach a three-dimensional tag in the CV video image, whereby an arbitral layer is generated and displayed such that the layer is overlapped with the CV video image.

In this way, a communication tool is realized in which all objects in the CV video image are shared on a web through an internet and a large number of people participate. In such a communication tool, an environment can be provided in which not only an administrator but also many and unspecific number of people can attach a CV tag in a CV video image, share a CV tag or a layer, share information, and freely participate. As a result, it is expected that the conventional internet environment will be changed drastically. In this case, it is needless to say that a CV tool to be published and a CV tool which remains unpublished can be separated, and an administrator (partly user for information dispatched by a user) has the option.

As for a CV video image to which a CV tag is attached or in which a layer is set, a plurality of video images differing in magnitude, such as high-altitude aerial images, low-altitude aerial images, ground images, images of structures and the images of the inside of buildings, can be integrated by three-dimensional coordinates.

In addition, by linking a video image and a map by utilizing the tag of the present invention and the "retrieval device for video device for displaying current status of road and river or the like" (Japanese Patent No. 3099103), not only a map and a video image are combined but also a map, an aerial image and a ground image can be three-dimensionally combined and related.

In addition, by using an all-surrounding image as a CV video image, an image capable of freely selecting the view point direction can be generated. Therefore, in the present invention, it is preferred that a CV video image be generated by using an all-surrounding image, and a three-dimensional CV tag be attached to the thus generated CV video image.

Furthermore, according to the second embodiment of the present application, in the CV tag image display device provided with layer generating and selecting functions of the present invention, the administrator device comprises:

a two-dimensional map storing means which stores two-dimensional map corresponding to a CV video image stored in the CV video image storing means, and the user device comprises:

a two-dimensional map display means which selects a desired two-dimensional map from the two-dimensional map storing means, receives the map and allow the map to be displayed on the display and, a camera position displaying means which displays a shooting position of the corresponding CV video image and a camera moving direction on the two-dimensional map which is displayed on the display, the CV video image selecting and displaying means selects and receives, from the CV video image storing means, a CV video image corresponding to an arbitral point which has been designated in the displayed two-dimensional map and allows the CV video image to be displayed on the display.

According to the CV tag video image display device provided with layer-generating and selecting functions of the present invention with the above-mentioned configuration, it is possible to display, together with a CV video image, a map showing the shooting location of the CV video image (including aerial images and satellite images). Furthermore, an arrow or the like indicating the position and moving direction of a camera with which the CV video image is taken can also be displayed on the map.

In distributing and displaying on a web the CV video image of the present invention, in order to clarify the display position and direction of each CV video image, it is preferred that a map indicating the shooting position of a motion picture be simultaneously displayed in various reduced scales in communication with the CV video image. Instead of a map, an aerial image or a satellite image may be displayed.

On a viewer of the user device, basic contents as a background image and a layer are overlapped, and a CV tag arranged on the layer becomes another contents, and then displayed as a synthesized image with a CV video image as the basic contents. Here, the basic contents is a CV video image, which is assumed to be a CV video image generated from an all-surrounding motion image. Although a CV video image is not necessarily generated from an all-surrounding motion image, it is advantageous in respect of accuracy to form a CV video image from an all-surrounding image if the all-surrounding video image requires a CV value. Furthermore, a CV video image may be either a taxiing image or an aerial image. That is, an aerial image can be one of contents as an image taken from a position at a high altitude. Furthermore, as the basic contents, a three-dimensional image generated from these CV video images can be used. Since a CV video image can be a three-dimensional image, if need arises, a CV video image can be a three-dimensional image to be used as the basic contents.

In respect the general concept of a layer, a map which is displayed simultaneously with a motion picture (two-dimensional surface) is considered as one of layers. The layer in the present invention is intended to mean a layer which constitutes a visually three-dimensional space. Therefore, a two-dimensional map is distinguished from the layer as referred to in the present invention.

A map can be considered as a three-dimensional map observed from the infinite point. In the present invention, a layer is an imaginary three-dimensional space which is arbitrarily selected or created by a user. A map is not a layer. A map is distinguished from a layer having a meaning of a three-dimensional space, and is explained as one of the contents.

As the contents other than those mentioned above, CG which is displayed in a synthesized manner with a CV video image can be mentioned. For example, CG is displayed as a CG advertisement after being synthesized with a CV video image. This CG can be classified as a tag, if it has a tag function of writing or reading information by clicking. However, if CG does not have a tag function and becomes part constituting the background together with a CV video image, CG can then be classified as other contents.

As in the case of a CV tag, a layer is defined to CG. CG has the same coordinate system as that of a CV tag. Therefore, it becomes a layer which constitutes the background together with a CV video image.

These can be considered as a specific layer for a web administrator and CG contents in the layer.

In a special case, the amount of CG to be synthesized with a CV video image is increased, and as a result, all of the CV video image may be CG. In such a case, CG becomes a basic contents. However, since the data of CG is heavy, in respect of data transmission, it is difficult to display by CG a wide range in detail as in the case of an actual image. Therefore, in the present invention, it is desirable to use CG and an actual image in combination.

As special contents other than those mentioned above, music or sound effects which are delivered in association with a CV video image or a CV tag can be mentioned. Although being not basic contents, they are considered to be useful for the effective operation of a system.

In addition, according to the third embodiment of the present application, in the CV tag image display device provided with layer generating and selecting functions according to the present invention, the user device comprises a storing means which stores, instead of the administrator device, part or all of prescribed information selected from a CV video image to be stored in the CV video image storing means of the administrator device, a CV tag and relevant information thereof to be stored in the CV tag storing means, layer information to be stored in the layer storing means and a two-dimensional map information to be stored in the two-dimensional map storing means.

According to the CV tag video image display device provided with layer generating and selecting functions of the present invention with the above-mentioned configuration, a CV video image and each layer, or a data base which stores map information can be distributed to the administrator device and the user device.

For example, a CV video image can be administrated by an administrator's server in the vicinity of a shooting area and each layer and a CG tag provided thereon can be stored and administrated in a computer of each user who generates a layer. A web administrator administrates the relationship of distributed servers which stores a CV video image, each layer and map data base, and sends to the user device a component screen which is required by a user, thereby allowing it to be displayed on the display of the user device.

By doing this, a lesser burden is imposed on the server of a web administrator (administrator device).

In order to realize a CV tag vide image display device provided with layer generating and selecting function according to the present invention, a web administrator is required to prepare a large amount of data of CV video image on a server. In addition, the data is required to be updated.

If a CV video image is images of roads in all parts of Japan (or the world), it is preferred that each data be administrated according to each region taking into consideration image updating or CV calculation. In addition, the web environment differs according to the region or the like. There are some regions or environments which are not suited to server installation.

Although the region or the area where a server is actually installed is limited, as compared with the case where all data is concentrated to a single location, more efficient data administration can be realized by allowing each data to be distributed to and registered by the administrator device and each user device.

Distributed administration can be performed also for layers, and each layer can be administrated by a user who sets up a layer by means of his or her user device.

Then, ultimately, an administrator and a user can no longer be distinguished from each other. There may be a case where everyone is a user and an administrator. It is also possible to divide the user into two groups; specifically, a user group who sets up and administrates layer which requires a strict administration and a user group who only browses and uses a CV video image which just includes a layer.

Furthermore, according to the fourth embodiment of the present application, in the CV tag image display device provided with layer generating and selecting functions according to the present invention, the administrator device comprises a real-time image means which captures a real-time image corresponding to a CV video image stored in the CV video image storing means and synthesizing and displaying the real-time image in the corresponding CV video image displayed in the display.

According to the CV tag video display device provided with layer generating and selecting functions according to the present invention with the above-mentioned configuration, an image or CG provided with real time information can be arranged in a layer, whereby the real time information can be displayed such that it is overlapped with a CV video image.

The layer according to the present invention can be freely generated by a user. Therefore, by incorporating a real time image into a layer or displaying CG generated from real time information, it is possible to distribute and display real time information which can be observed by other users or the like on the real-time basis.

For example, a house in which an aged person is living alone is stored in a CV video image data base, and a device showing the position of the aged person is installed. By doing this, an observer can observe the position of the aged person on the real-time basis, whereby the safety of the aged person can be ensured. In this way, it can enhance the quality of the care for old people.

Furthermore, by installing in stores or the like a device detecting the move of people after the close of the store, a night monitoring video image can be observed on the real-time basis in the CV video image according to the present invention.

In the CV tag video image display device provided with layer generating and selecting functions of the present invention, the layer generating means may not generate layers at first, and directly generate in the CV video image prescribed CV tags composed of CG, video images or the like. Then, the CV tags are arranged such that the coordinates thereof being integrated with the CV video image. The CV tags are classified according to attribute information of the contents image, and one or two or more layers may be generated according to the classification.

According to the CV tag video image display device provided with layer generating and selecting functions of the present invention with the above-mentioned configuration, a programmed layer becomes unnecessary by allowing the attribute of the contents of CG or the like to have a function of classifying the hierarchy so as to act instead of a layer.

The layer according to the present invention is necessary both in idea and administration, and corresponds to one three-dimensional world among a plurality of worlds composed of a plurality of layers set up on the common CV video image. Therefore, the layer is not necessarily a programmed layer. It is possible to bring out the same effects as those attained by classification by layers if classified according to the attribute of things which are displayed on a layer (CG or an image, for example).

Therefore, according to the present invention, it is possible to attain a configuration in which no programmed layer is present by allowing the attribute of the contents such as CG to classify the hierarchy to act instead of a layer.

However, in respect of explanation or idea, it is advantageous to assume a layer in which images are overlapped for display. Therefore, in the specification of the present invention, an explanation is made on the assumption that a programmed layer exists.

In addition, the above-mentioned method is one example of generating a layer, and it is needless to say a layer can be generated by other methods.

Furthermore, according to the fifth embodiment of the present application, in the CV tag image display device provided with layer generating and selecting functions according to the present invention, the user device comprises a storing means which stores, of the layer information to be stored in the layer storing means, layer information relating to a layer generated by the user device instead of the administrator device.

According to the CV tag video display device provided with layer generating and selecting functions according to the present invention with the above-mentioned configuration, each layer and contents and various data which are used within a layer can be stored in a storing device of a computer of a layer user who administrates the inside of the layer, whereby a less burden is imposed on a server of a web site administrator.

The CV tag video display device provided with layer generating and selecting functions according to the present invention can be realized by allowing a web site administrator to administrate all the contents and data by a server owned by the web site administrator (administrator device) and distributing the contents and data to each user device.

However, since the amount of contents and data is significantly large, it is desirable to administrate the server in a distributed manner.

By allowing each layer and contents used within the layer to be administrated by a layer user who administrates the inside of the layer, i.e. a user who generates and sets up the layer, and allowing each layer and contents to be stored in a storing device of the user device of the user, it is possible to lighten the burden imposed on a server of a web site administrator.

As another method for lightening the burden imposed on a server of a web server administrator, it is possible to distribute prescribed data to a server of a corporate which uses the CV tag video display device provided with layer generating and selecting functions according to the present invention. In the case of region-specific contents, a burden may be imposed on a server in the region.

Therefore, in the administrator device of the web site administrator, a CV video image, a layer, map information or the like are not stored at all, and data is distributed to each user device, thereby allowing the administrator device to perform only access control.

In the administrator device of the web site administrator, a user device and a user name, which have been registered in a storing device of the administrator device, are registered by means of an ID administration means. In addition, a communication record between user devices remains. Furthermore, by the ID administration means, all of CV video images, layers, CV tags, and relevant information within the CV tag are administrated, and in response to a request from a plurality of user devices through a network, contents, a layer and data which are necessary are selected, combined, distributed and recorded. Even if a user name is not registered, it is possible to respond to a user within a permissible range, and distribute required data within a permissible range.

That is, a web site administrator administrates the ID of contents, and grasps and recognizes which contents is present in which server, and administrates the ID of all layers. Accordingly, the administrator device, when it detects a layer which has been designated and selected by the user device, can transmit data indicating a server where the contents necessary for this layer exist, and at the same time, can send instructions to a server in the corresponding region.

By this configuration, a user can automatically access a server designated by a web site administrator, stores all contents and data which constitute an image in the user display, and configure as an intended screen.

As examples of the contents or data to be administrated by a server or the like of each user device, all-surrounding video images, CV values, aerial images, maps, accounting information or the like can be given. In each layer, a person who has right to use the layer can freely compose contents using the common format.

Since a web stands aloof from a position in a space, a regional server is not necessarily installed in the corresponding region. Here, a region is a region in respect of data administration, and does not necessarily mean a geographical location.

Furthermore, according to the sixth embodiment of the present application, in the CV tag image display device provided with layer generating and selecting functions according to the present invention, the CV video image storing means stores a plurality of CV video images taken for the same object area at different times.

According to the CV tag video display device provided with layer generating and selecting functions according to the present invention with the above-mentioned configuration, it is possible to update the data of a CV video image, and is possible to distribute and display a CV video image in the time axis direction; i.e. from past to present at the same location in the same region.

As a result, the data base of a CV video image can be administrated not only in a broader area of the region but also in the time axis direction, so that it can be administrated in the time axis direction extending from the past to the present. As a result, a plurality of worlds composed of a plurality of layers is extended also in the time axis direction.

As mentioned above, according to the CV tag video display device provided with layer generating and selecting functions according to the present invention, it is possible to bring to a web a three-dimensional image which is close to the real world, treat the image three-dimensionally as in the real life, and an arbitrary number of worlds close to the real world can be provided.

In addition, by providing a plurality of worlds close to each other, an observer can freely select one from these, and can participate in a preferable world.

Furthermore, a participant can create a world which is close to the real world in the manner he or she prefers.

As a result, a bi-directional communication between a web site administrator and a user and a multi-directional communication among users can be realized, and a plurality of worlds by a plurality of layers which acts in this relationship can be realized.

That is, according to the present invention, a plurality of worlds corresponding to the real world (not necessarily accurately correspond to the reality) can be provided on a web. The plurality of worlds according to the present invention can be called "the web parallel world (WebWPW)", named after the "Parallel World" of the modern theory of the universe. In other words, a parallel world model in the modern theory of the universe is realized on a web in an imitative way.

In WPW, as can be imagined from the Parallel World of the modern theory of the universe, a plurality of worlds can be simultaneously established based on the same image of the real world. In addition, it is possible to apply a single rule to each one of the worlds.

That is, in WPW, extremely intuitive worlds can be simultaneously provided based on the actual world. By selecting freely, a user can create and use his (or her) own world. These worlds are separated by layers.

Here, it is appropriate that a layer which creates this single layer is clearly separated in the program. No apparent programmed layer may not necessary be present, and an imaginary layer may be used instead.

As for the web sites which have been launched on an internet up to date, the screen configuration or the like of the site is entirely determined by a web administrator. According to the present invention, by the above-mentioned CV tag and layer generation, the screen configuration can be determined appropriately not only by the web administrator but also by the user.

As a result, an individual rule is given to each world separated by the layer, thereby enabling not only a site administrator but also a user to develop his or her own world in a layer.

The WPW according to the present invention is based on a three-dimensional video image. Therefore, as in the case of the real world, intuitive recognition and understanding are possible, and various processing and handling can be performed intuitively. That is, a user can move a three-dimensional world which is the same as the real world and can start an intended action.

A motion picture which is used as the background of a plurality of worlds provided by the present invention is not necessarily an actual image. However, it is preferred that the back ground motion picture be an actual image or a motion picture created based on an actual image.

According to the CV tag video image display device provided with layer generating and selecting functions of the present invention, under a network environment such as an internet or a LAN, it is possible to distribute video images of actual streets, roads and the inside and outside of a store. At the same time, a user can attach a tag or write information to an arbitral position of a video image. Furthermore, it is possible to set a plurality of layers which has been classified according to different contents attributes or the like can be set in a video image of the same area.

By this configuration, it becomes possible to provide plural worlds (parallel world model) composed of a plurality of layers in which virtual spaces and stores and a plurality of worlds, which are closer to the real world, are set on a web in an overlapped manner, whereby a CV tag video image display device provided with layer generating and selecting functions which is suited for selling merchandises, advertising stores and firms, town guides, map information utilizing an internet can be provided.

BRIEF DESCRIPTION OF THE DRAWINGS

FIG. 4 is an explanatory view showing a converted image obtained from an image taken by an all-surrounding camera, in which (a) is a virtual spherical surface to which a spherical image is attached; (b) is a spherical image which has been attached to a spherical surface, and (c) is a view which is obtained by developing the spherical image shown in (b) into a plane according to the Mercator's method;

FIG. 6 is an explanatory view showing a specific method for detecting a camera vector in the CV calculating part according to one embodiment of the present invention;

FIG. 23 is an explanatory view which diagrammatically shows the configuration in which servers storing a CV video image, layer information and map information are distributed to each user device in the CV tag video image display device provided with layer generating and selecting functions according to one embodiment of the present invention.

BEST MODE FOR CARRYING OUT THE INVENTION

Figure 1:
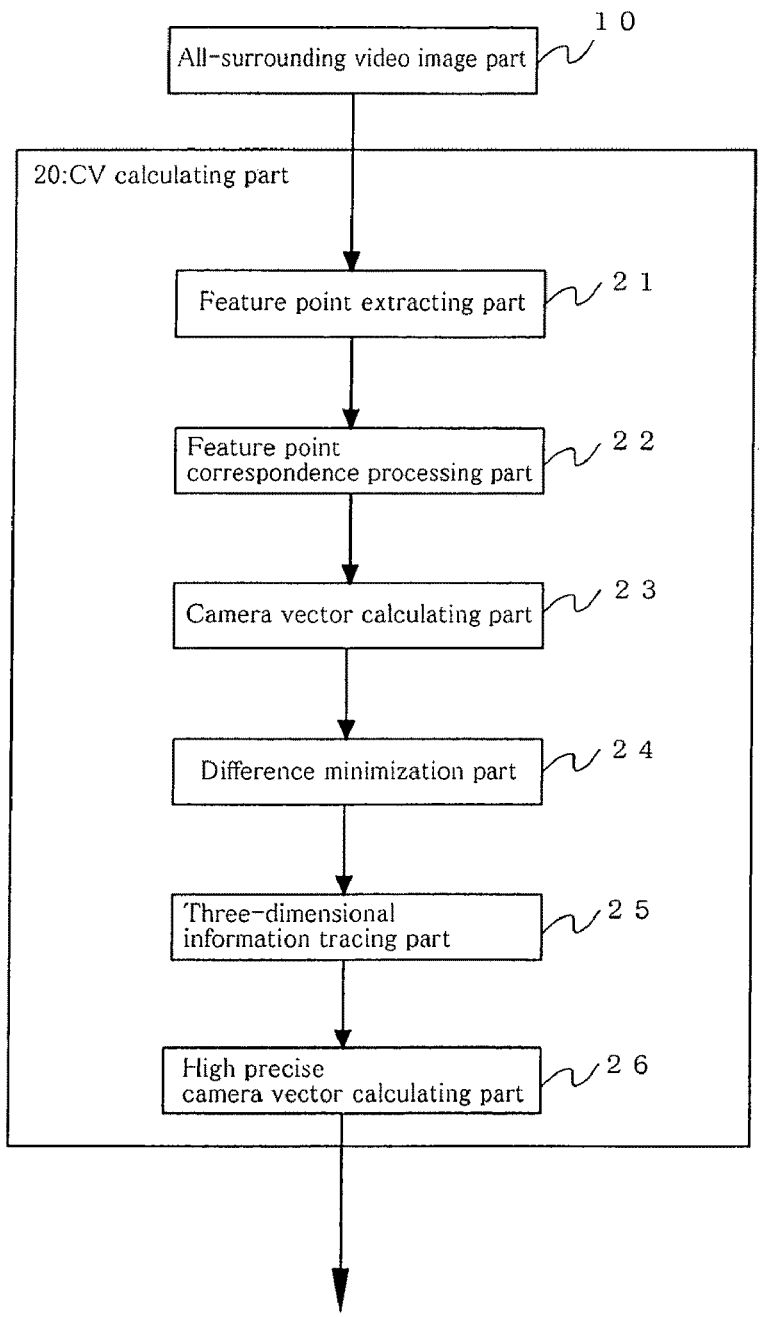
FIG. 1 is a block diagram showing a basic configuration of one embodiment of a CV calculator part for generating a CV video image, which is used in the CV tag video image display device provided with layer generating and selecting functions of the present invention.

A preferred embodiment of the CV tag video image display device provided with layer generating and selecting functions according to the present invention will be explained referring to the drawings.

Here, the CV tag video image display device provided with layer generating and selecting functions according to the present invention is realized by processing, means and functions which are executed on a computer according to the instructions of a program (software). The program sends instructions to each constituting element of a computer, and allows the computer to execute predetermined processing or functions given below. For example, each constituting element of a computer is caused to execute automatic extraction of control points or feature points in a video image, automatic tracing of the extracted control points, calculation of three-dimensional coordinates of the control points, calculation of a CV (camera vector) value, generation/attachment of a tag, call-out and display of data base information liked to a CV tag, call-out and display of a layer corresponding to a CV video image or the like. As mentioned above, each processing or means in the present invention is realized by a specific means realized by the cooperation of a program and a computer.

In the meantime, all or part of the program is provided, for example, by a magnetic disc, an optical disc, a semiconductor memory and other storing medium readable by a computer. A program which has been read from a storing medium is installed on and executed by a computer. A program can be directly installed on and executed by a computer via a communication line, without being read by a storing medium.

[CV Calculation]

The outline of the CV calculation on which the CV tag video image display device provided with layer generating and selecting functions of the present invention is based will be explained referring to FIGS. 1 to 13.

The CV calculation means obtaining a CV value, and the resulting value is called a CV value or CV data. The term "CV" stands for "camera vector", and the camera vector (CV) is a value indicating a three-dimensional value and three-axial rotation posture of a video camera or the like which takes an image for the purpose of instrumentation or the like.

The CV calculation includes capturing a motion picture (video image), detecting feature points in the image, tracing the detected feature points in adjacent plural frames, generating a number of triangles formed by the camera position and the tracing the path of the feature points in the image, and analyzing the triangle to obtain the three-dimensional position and 3-axis rotation posture of a camera.

The characteristic feature of the CV calculation resides in that, in the process of obtaining a CV value, three-dimensional coordinates can also be obtained for feature points (control points) in an image.

Furthermore, as for a CV value obtained from calculation form a motion picture, a three-dimensional camera position and a three-dimensional camera posture can be obtained simultaneously corresponding to each frame of the motion picture. In addition, in principle, a CV value can be obtained in correspondence with a video image using only one camera, which is an excellent feature realized by the CV calculation.

For example, in other instrumentation methods (GPS, IMU or the like), since an image frame and a sampling time for instrumentation are required to be completely synchronized with a high degree of accuracy in order to obtain a three-dimensional camera position and a three-dimensional camera posture, an extremely costly apparatus or equipment is needed, which making actual implementation difficult.

The CV data obtained by calculation from a motion picture is a relative value before processing. However, for a short distance, it is possible to obtain three-dimensional position information and angle information of the 3-axis rotation with a high degree of accuracy.

In addition, since CV data is acquired from an image, the acquired data is a relative value. However, the CV calculation has excellent characteristics that the positional relationship with an arbitral object in an image can be measured, which cannot be realized by other methods.

Furthermore, since CV values corresponding to an image can be obtained, the CV calculation which enables the position and 3-axis posture of a camera to be obtained directly from an image is suited to intra-image instrumentation or intra-image measurement.

The CV tag video image display device provided with layer generating and selecting functions according to the present invention is a device which conducts generating of a CV tag and attachment of the generated CV tag to a video image, generation and display of layers based on CV value data obtained by this CV calculation.

[CV Calculating Part]

Figure 15:
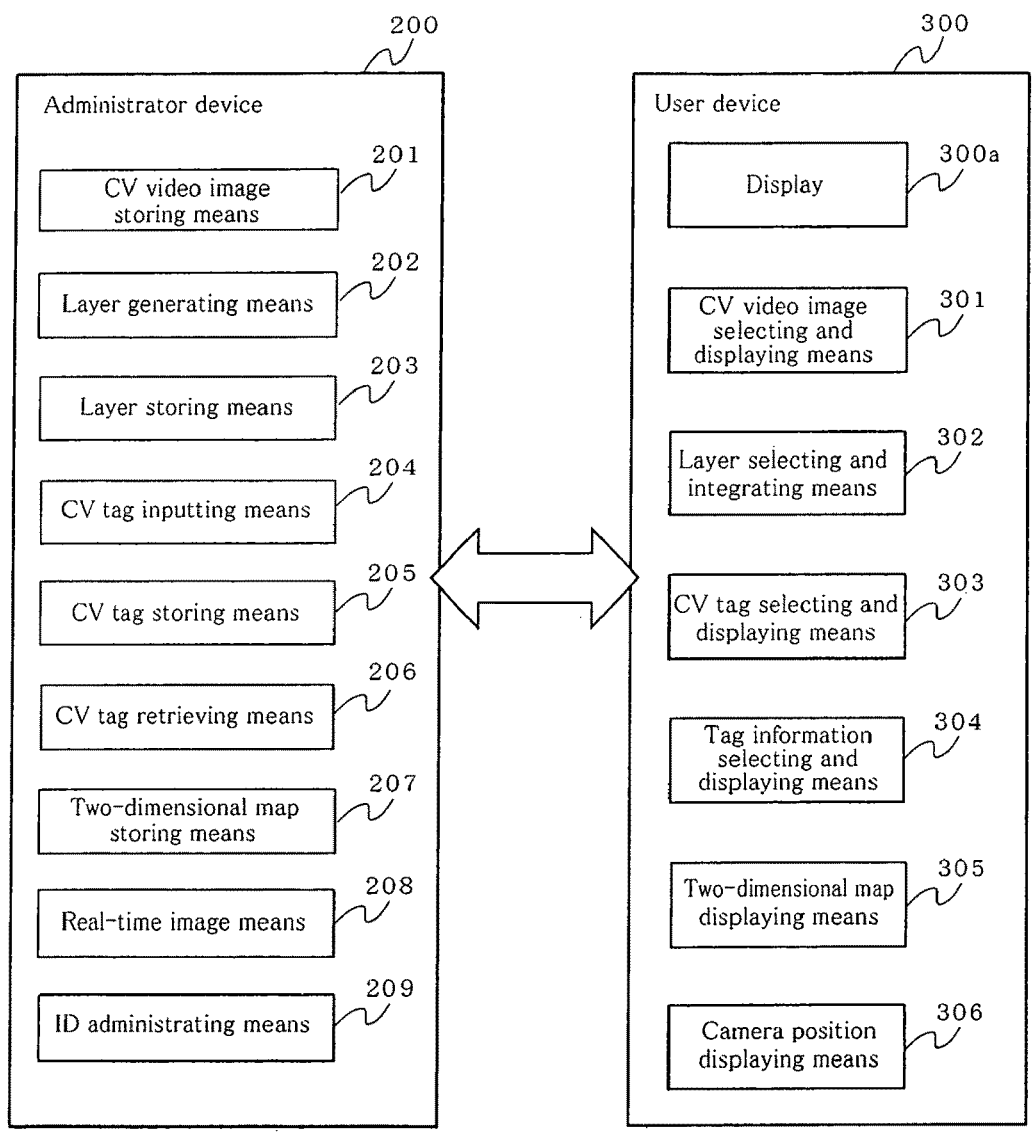
FIG. 15 is a block diagram showing a specific configuration of an administrator device and a user device of the CV tag video image display device provided with layer generating and selecting functions according to one embodiment of the present invention.

CV calculation is a calculation processing for generating a CV video image to be stored in a CV video image storing means of the CV tag video image display device provided with layer generating and selecting functions 100 (see FIG. 15). Specifically, CV calculation is conducted at a CV calculating part 20 shown in FIG. 1.

As shown in FIG. 1, the CV calculating part 20 is configured to perform a predetermined CV calculation processing for a video image which is inputted from an all-surrounding video image part 10 which comprises a video camera or the like, and specifically, it is provided with a feature point extraction part 21, a feature point correspondence processing part 22, a camera vector calculating part 23, a difference minimization part 24, a three-dimensional information tracing part 25 and a high-accuracy camera vector calculation part 26.

As for a video image to be used in CV calculation, any video image is possible. However, in the case of an image with a narrow field angle, the image is interrupted when moved in the view point direction. Therefore, it is preferred that an image be an all-surrounding image (see FIGS. 2 to 4). Here, a motion picture is the same as a continuing static image, and hence, can be treated like a static image.

Generally, a motion picture which has been recorded in advance is used. However, it is possible to use an image which is recorded on the real-time basis in coordination with the move of a moving body such as a vehicle.

In this embodiment, an all-surrounding video image part 10 is provided which generates and displays a synthesized image of a map and a video image by using, as an image to be used for CV calculation, an all-surrounding image which is obtained by shooting the 360-degree all surrounding of a moving body such as a vehicle (see FIGS. 2 to 4) or a wide-angle image which is close to an all-surrounding image (see FIG. 1).

The plane-developing of an all-surrounding image means expressing an all-surrounding image in a perspective way as a normal image. Here, the reason for using the term "perspective" is as follows. An all-surrounding image itself is displayed by a method which is different from the perspective method, for example, by the Mercator method or the spherical projection method (see FIG. 4). By allowing the image to be plane-developed, the image can be converted to a normal perspective image.

Figure 2:
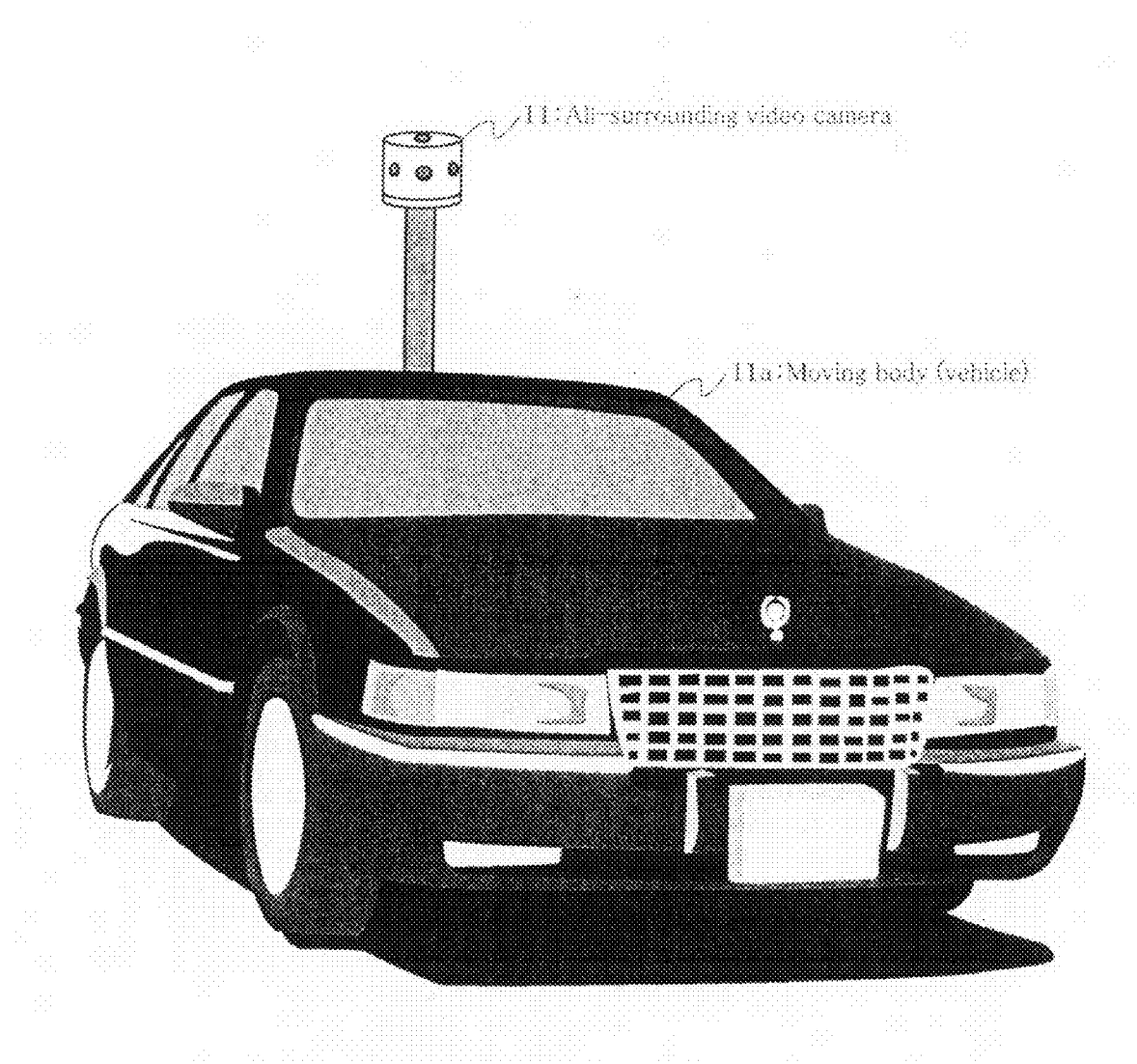
FIG. 2 is a schematic view showing a means for taking an all-surrounding video image used in the CV calculating part shown in FIG. 1, which is a perspective view of a vehicle having an all-surrounding camera on the top thereof.
Figure 3:
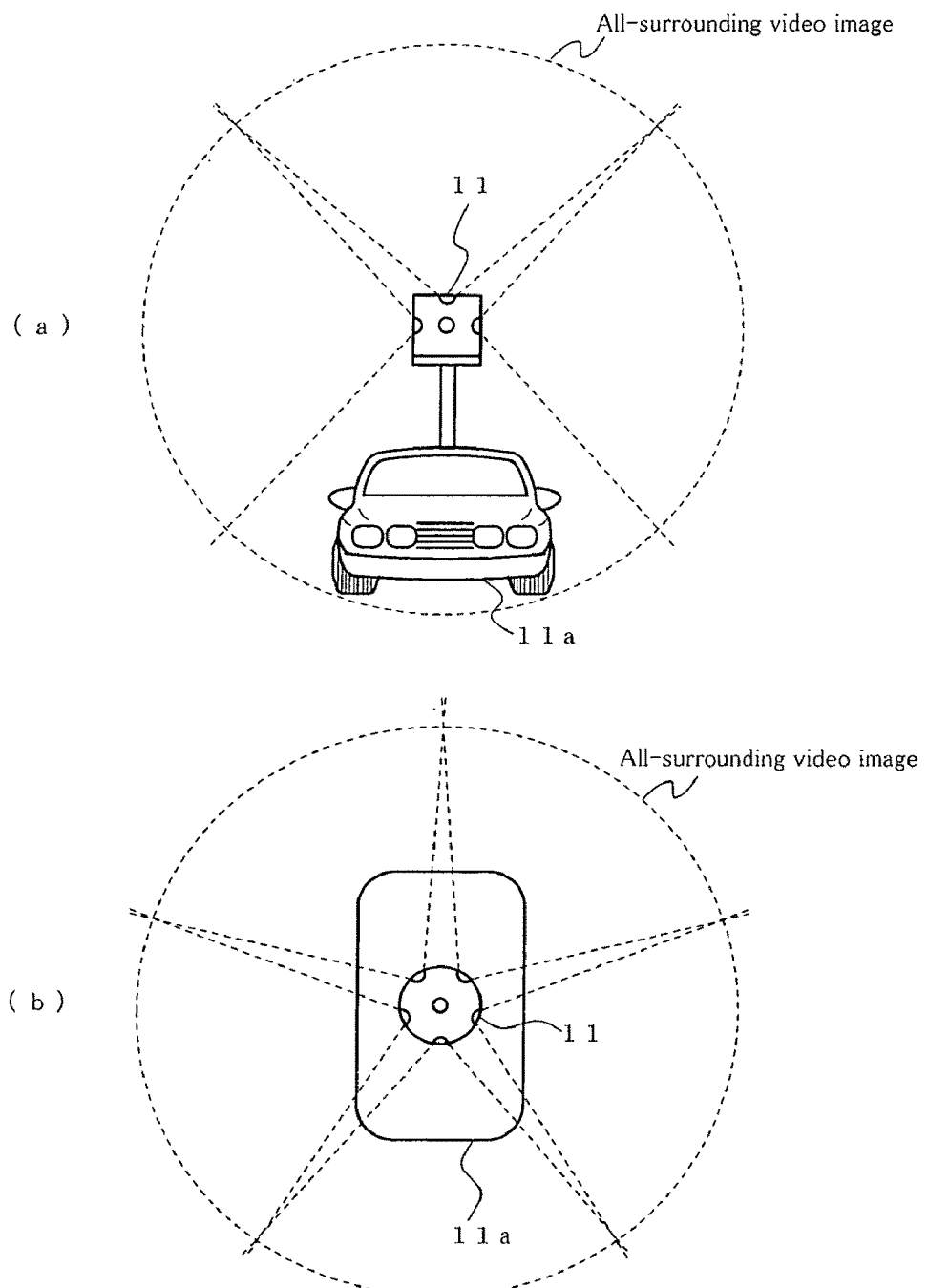
FIG. 3 is a schematic view showing a means for taking an all-surrounding video image used in the CV calculator part shown in FIG. 1, in which (a) is a plan view of a vehicle having an all-surrounding camera on the top thereof; and (b) is a front view of the vehicle.

In order to generate an all-surrounding image in the all-surrounding video image part 10, as shown in FIG. 2 and FIG. 3, using an all-surrounding video camera 11 with the aim of obtaining CV value data, an image of an area surrounding a moving body 11a is taken with the move of the moving body 11a by means of the all-surrounding video camera 11 fixed to the moving body 11a such as a running vehicle.

In order to obtain the position coordinates thereof, the moving body 11a may be provided with position instrumentation equipment or the like which is composed of GPS equipment alone or a combination of GPS equipment and IMU equipment, or the like.

The all-surrounding video camera 11 to be mounted on the moving body 11a may have any configuration insofar as it can shoot and capture a wide-range video image. Usable cameras include a camera provided with a wide-angle lens or a fish-eye lens, a mobile camera, a fixed camera, a camera obtained by fixing a plurality of cameras and a camera which can be rotated 360 degrees.

In this embodiment, as shown in FIG. 2 and FIG. 3, a plurality of cameras are integrally fixed to a vehicle, whereby the all-surrounding video camera 11 which shoots a wide-range image with the move of the moving body 11a is used.

According to the above-mentioned all-surrounding video camera 11, as shown in FIG. 3, if mounted on the top of the moving body 11a, images of the 360-degree surrounding of the camera can be simultaneously taken by a plurality of cameras. In addition, with the move of the moving body 11a, a wide range image can be obtained as motion picture data.

Here, the all-surrounding video camera 11 is a video camera which can directly capture an all-surrounding image of a camera. However, if a camera can capture more than half of the all-surrounding of the camera as an image, this image can be used as an all-surrounding video image.

Furthermore, in the case of an image taken by an ordinary camera of which the filed angle is restricted, it can be treated as part of an all-surrounding image although the accuracy of CV calculation is lowered.

A wide range image taken by the all-surrounding video camera 11 can be attached to a virtual spherical surface corresponding to the field angle at the time of shooting.

The spherical surface image data which has been attached to a virtual spherical surface is stored and outputted as a spherical surface image (360-degree image) in a state in which it is attached to a virtual spherical surface. A virtual spherical surface can be set in an arbitral spherical shape with a camera part for obtaining a wide range image being a central point.

FIG. 4(a) is an image of an external appearance of a virtual spherical surface to which a spherical image is attached, and FIG. 4(b) is one example of a spherical surface image which has been attached to a virtual spherical surface. FIG. 4(c) is an example of an image obtained by plane-developing the spherical surface image shown in FIG. 4(b) according to the Mercator' method.

An all-surrounding video image which has been generated and captured as mentioned above is inputted to the CV calculating part 20, whereby CV value data is obtained (see FIG. 1).

In the CV calculating part 20, first, the feature point extracting part 21 automatically extracts a sufficient number of feature points (control points) from motion picture data which are taken by the all-surrounding video camera 11 of the all-surrounding video image part 10 and temporarily stored.

The feature point correspondence processing part 22 automatically traces, in each frame between the frames, feature points which have been automatically extracted, whereby the correspondence is automatically obtained.

The camera vector calculating part 23 automatically obtains a camera vector corresponding to each frame image from the three-dimensional positional coordinates of the feature points of which the correspondence has been obtained.

The difference minimization part 24 conducts calculation for a plurality of camera positions, conducts statistic processing such that the distribution of camera vector solutions is minimized. Then, it automatically determines the camera position direction of which the difference is minimized.

The three-dimensional information tracing part 25 positions the camera vector obtained in the camera vector calculating part 23 with an approximate camera vector value, and based on three-dimensional information which is obtained sequentially in the later processes as part of an image, automatically traces partially three-dimensional information contained in a plurality of frame images along with images in adjacent frames.

Here, the three-dimensional information (three-dimensional shape) mainly means three-dimensional distribution of feature points. That is, it is a three-dimensional assembly of points, and this three-dimensional assembly of points constitutes a three-dimensional shape.

Based on the tracing data obtained in the three-dimensional information tracing part 25, the high-accuracy camera vector calculating part 26 generates and outputs a further more accurate camera vector than the camera vector obtained in the camera vector calculating part 23.

Then, a CV video image to which a camera vector (CV value) is attached, which is obtained as mentioned above, is inputted to the CV tag vide image display device provided with layer generating and selecting functions 100 which will be mentioned later, and used for generation and attachment of a CV tag, generation of a layer or the like.

Several methods can be used to detect a camera vector from feature points of a plurality of images (motion pictures or continuing static images). In the CV calculating part 20 of this embodiment shown in FIG. 1, a sufficiently large number of feature points are automatically extracted in an image. By automatically tracing these extracted feature points, a three-dimensional vector and a 3-axial rotation vector of a camera is obtained by the Epipolar geometry.

By taking a sufficiently large number of feature points, camera vector information is overlapped. A difference in the overlapped information is minimized, whereby a more accurate camera vector can be obtained.

The camera vector means the vector of the free degree of a camera.

Generally, a three-dimensional object has six free degrees; specifically, the positional coordinates (X, Y, Z) and the rotational angles ($\phi x$, $\phi y$; $\phi z$) of each coordinate.

Therefore, the camera vector means the vector of six free degrees; specifically the positional coordinates (X, Y, Z) of a camera and the rotational angles ($\phi x$, $\phi y$, $\phi z$) of each coordinate.

When a camera moves, the free degree includes the direction of moving. The moving direction can be obtained by differentiating the above-mentioned six free degrees.

As mentioned above, the detection of a camera vector in this embodiment means that six values of free degree of a camera are taken for each frame, and six different free degrees for each frame are determined.

The method for detecting a camera vector in the CV calculating part 20 will be explained below by referring to FIG. 5 and following figures.

First, image data captured by the all-surrounding video camera 11 of the above-mentioned all-surrounding video image part 10 is inputted, either directly or indirectly, to the feature point extracting part 21 of the CV calculating part 20. In the feature point extracting part 21, points or small region images to become feature points are automatically extracted. In the feature point correspondence processing part 22, the correspondence of the feature points between a plurality of frame images is automatically obtained.

Specifically, feature points are obtained in a number which is equal to or more than the fully necessary number on which the detection of a camera vector is based.

Figure 5:
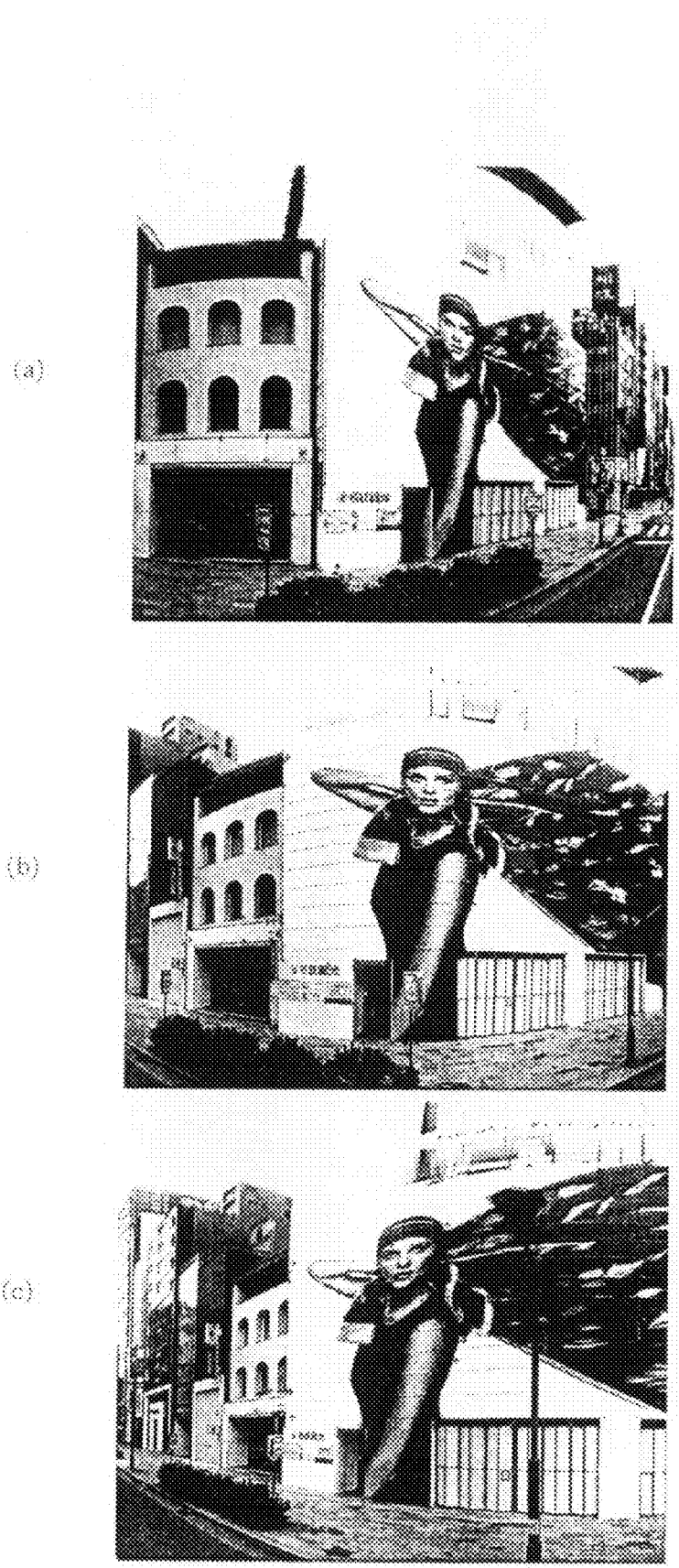
FIG. 5 is an explanatory view showing a specific method for detecting a camera vector in the CV calculating part according to one embodiment of the present invention.
Figure 7:
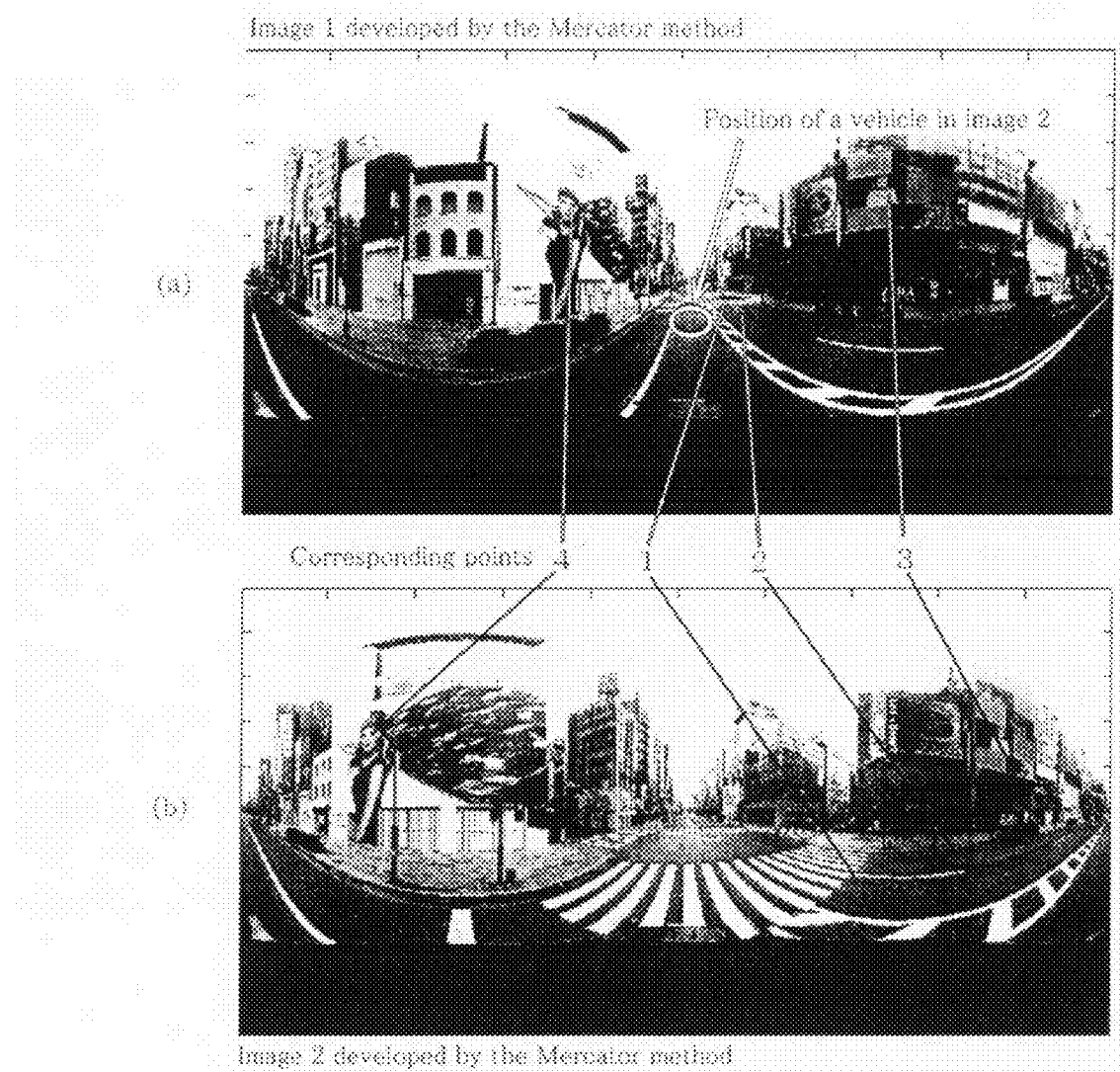
FIG. 7 is an explanatory view showing a specific method for detecting a camera vector in the CV calculating part according to one embodiment of the present invention.

One example of the feature points and the correspondence thereof are shown in FIGS. 5 to 7. In these figures, the portions indicated by "+" are feature points which are automatically extracted, and the correspondence is automatically traced between a plurality of frame images (see correspondence points 1 to 4 shown in FIG. 7).

Figure 8:
FIG. 8 is an explanatory view showing an embodiment in which desired feature points are designated in the method for detecting a camera vector in the CV calculating part according to one embodiment of the present invention.

Here, as shown in FIG. 8, it is preferred that feature points be extracted such that a sufficiently large number of feature points are designated and extracted in each image (see ○ in FIG. 8). For example, about one hundred feature points are extracted.

Subsequently, in the camera vector calculating part 23, the three-dimensional coordinates of the feature points are obtained by calculation, and a camera vector is obtained based on the three-dimensional coordinates. Specifically, the camera vector calculating part 23 continuously calculates the relative value of various three-dimensional vectors such as a positional vector between a sufficient number of feature points present in each of continuing frames and a moving camera, a 3-axis rotational vector of a camera, a vector combining each camera position and feature points.

In this embodiment, a camera motion (camera position and camera rotation) is calculated by solving an Epipolar equation from the Epipolar geometry of a 360-degree all-surrounding, image.

The images 1 and 2 shown in FIG. 7 are images obtained by Mercator-developing a 360-degree all-surrounding image. When the latitude and the longitude are taken as $\phi$ and $\theta$, respectively, the points in the image 1 are expressed as ($\theta 1$, $\phi 1$) and the points in the image 2 are expressed as ($\theta 2$, $\phi 2$). The spatial coordinates in each camera is expressed as z1= (cos $\phi 1$ cos $\theta 1$, cos $\phi 1$, sin $\theta 1$, sin $\phi 1$) and z2=(cos $\phi 2$ cos $\theta 2$, cos $\phi 2$ sin $\theta 2$, sin $\phi 2$).

When the moving vector and the rotational matrix of a camera are taken as t and R, respectively, the Epipolar equation is expressed as z1T[t]×Rz2=0.

Due to a sufficient number of feature points, t and R can be calculated as the solution obtained by the least square method by the linear algebra. Calculation is conducted by applying this calculation to the corresponding plurality of frames.

Here, as the image to be used for the calculation of a camera vector, it is preferable to use a 360-degree all-surrounding image.

As the image to be used for the camera vector calculation, in principle, any image can be used. However, a wide range image such as a 360-degree all-surrounding image as shown in FIG. 7 is preferable since a large number of feature points can be selected uniformly in many directions.

In this embodiment, a 360-degree all-surrounding image is used for CV calculation. As a result, the tracing distance of feature points can be prolonged, and a sufficiently large number of feature points can be selected in any direction. That is, feature points suited respectively to a long distance, a middle distance and a short distance can be selected. When calibrating a rotational vector, calculation operation can be facilitated by adding an extreme rotation conversion operation. As a result, it can be possible to obtain more accurate calculation results.

In FIG. 7, to make the operation in the CV calculating part 20 more understandable, an image which is obtained by a process in which a 360-degree all-surrounding spherical image obtained by synthesizing images taken by one or a plurality of cameras is developed by the Mercator' method in map projection. In actual CV calculations, it is not necessary to use an image developed by the Mercator method.

In the difference minimization part 24, a plurality of equations is generated due to a plurality of camera positions and a plurality of feature points corresponding to each frame. Then, a vector based on each feature point is obtained in plural numbers by calculation. The vectors are then statistically processed such that the distribution of feature points and camera positions is minimized, whereby a final vector is obtained. For example, for the camera position and camera rotation of a plurality of frames and a plurality of feature points, an optimum solution of the least square method by the Levenberg-Marquardt method is assumed. Then, a difference is converged, whereby the coordinates of camera position, camera rotation matrix and feature points are obtained.

Furthermore, by deleting feature points of which difference distribution is large, and repeating calculation based on other feature points, accuracy of calculation at each feature point and camera position is enhanced.

As a result, the position of feature points and the camera vector can be obtained with a high degree of accuracy.

Figure 9:
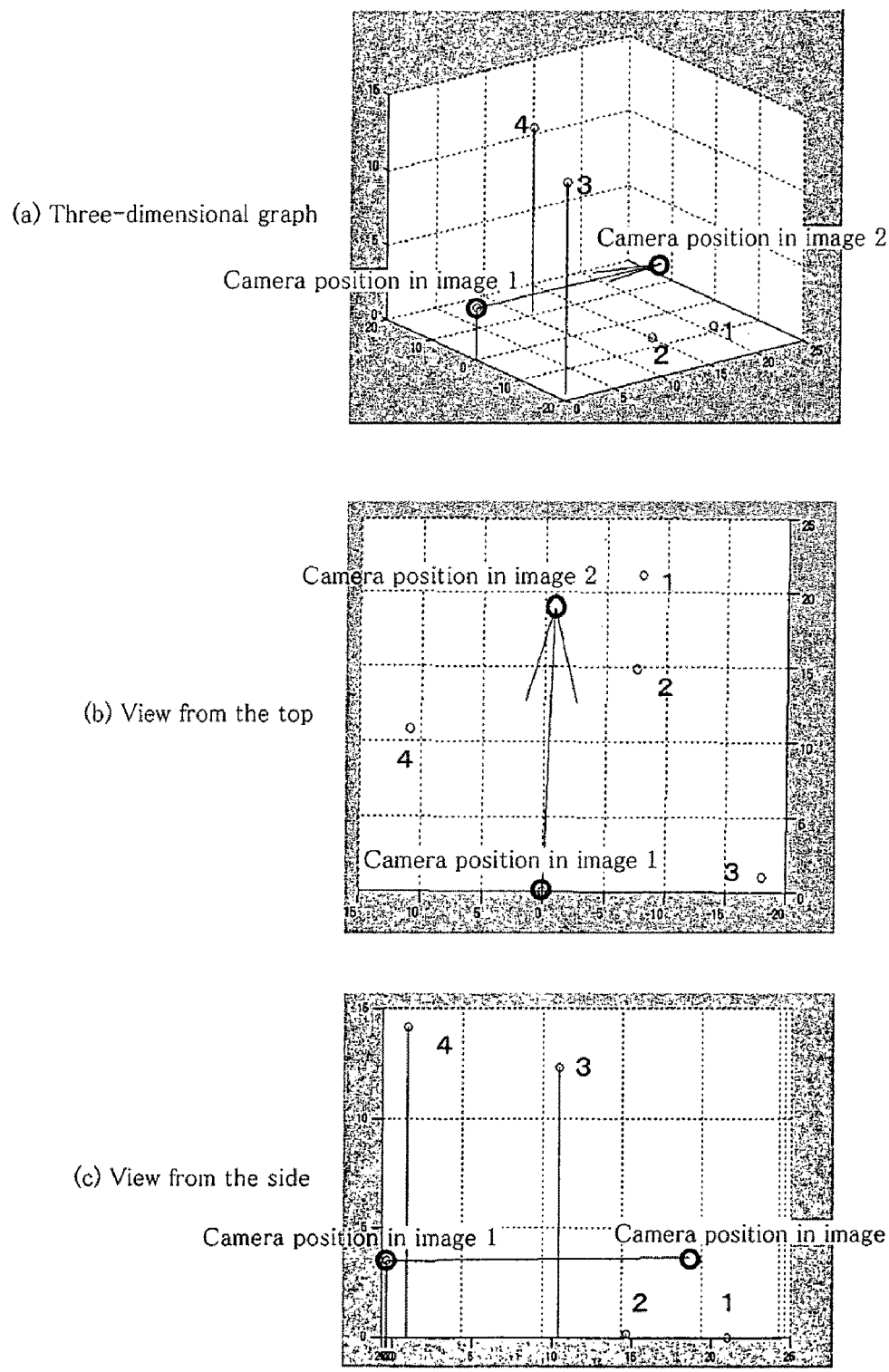
FIG. 9 is a graph showing one example of three-dimensional coordinates of feature points obtained by the CV calculating part and a camera vector according to one embodiment of the present invention.
Figure 10:
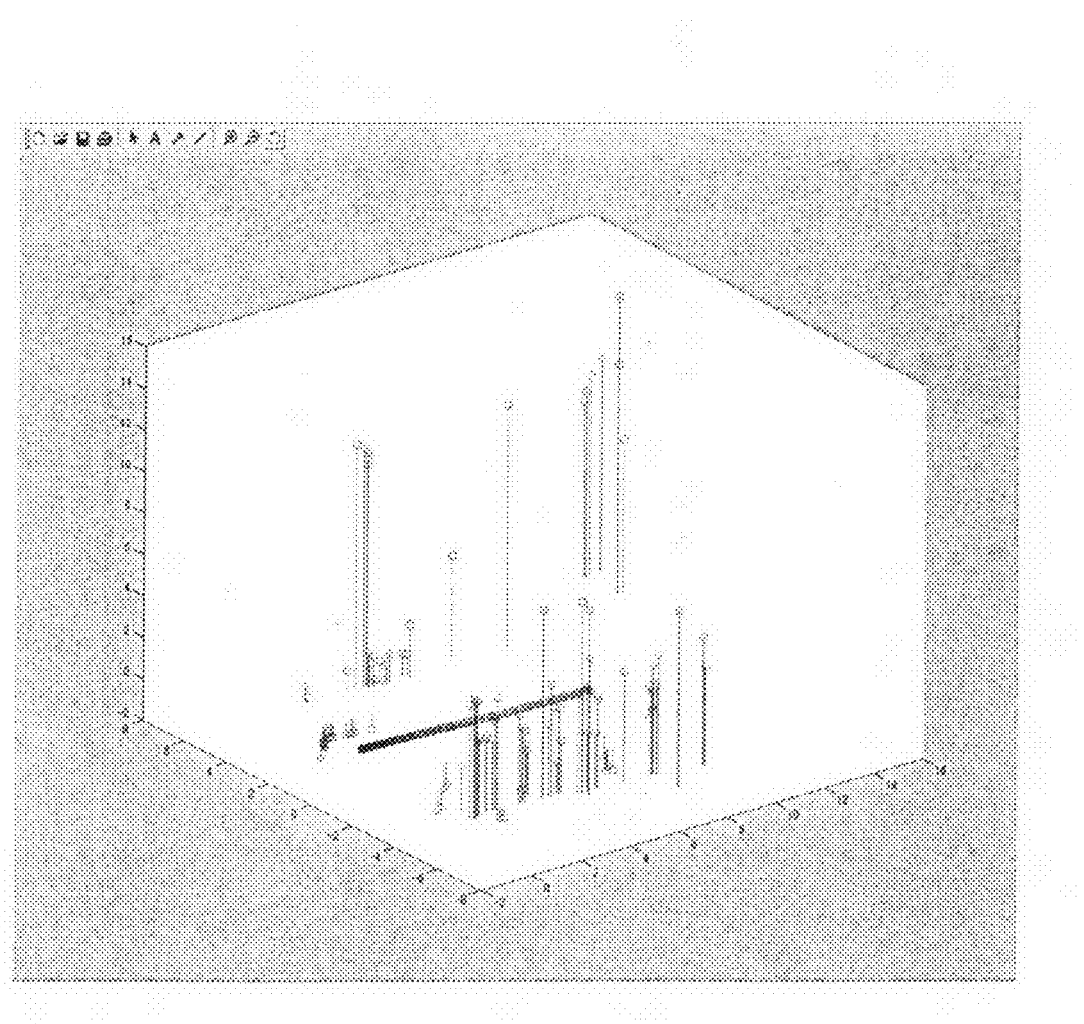
FIG. 10 is a graph showing one example of three-dimensional coordinates of feature points obtained by the CV calculating part and a camera vector according to one embodiment of the present invention.
Figure 11:
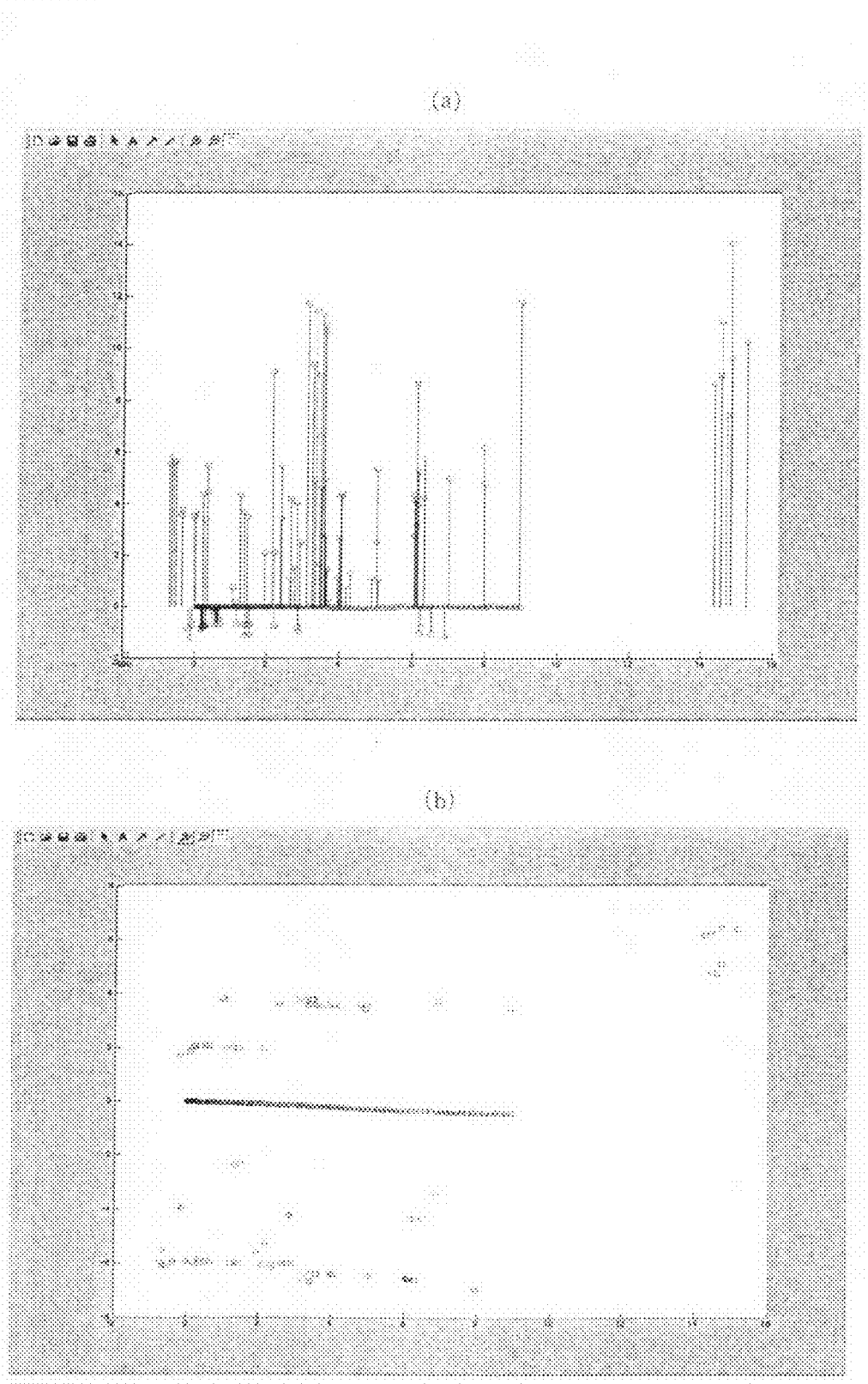
FIG. 11 is a graph showing one example of three-dimensional coordinates of feature points obtained by the CV calculating part and a camera vector according to one embodiment of the present invention.

FIGS. 9 to 11 show an example of the three-dimensional coordinates of feature points and camera vectors obtained by CV calculation. FIGS. 9 to 11 are each an explanatory view showing the method for detecting a vector in the CV calculation in this embodiment, in which a positional relationship between a camera and an object obtained by a plurality of frame images captured by a moving camera is shown.

In FIG. 9, three-dimensional coordinates of feature points 1 to 4 shown in the images 1 and 2 of FIG. 7 and camera vectors (X, Y, Z) which move between the image 1 and the image 2 are shown.

In FIGS. 10 and 11, a sufficiently large number of feature points and the positions of the feature points obtained by a frame image and the positions of a moving camera are shown.

In these figures, ○ marks which continue linearly in the middle of the graph indicate camera positions, and ○ marks which exist in the vicinity thereof indicate the position and height of the feature points.

Figure 12:
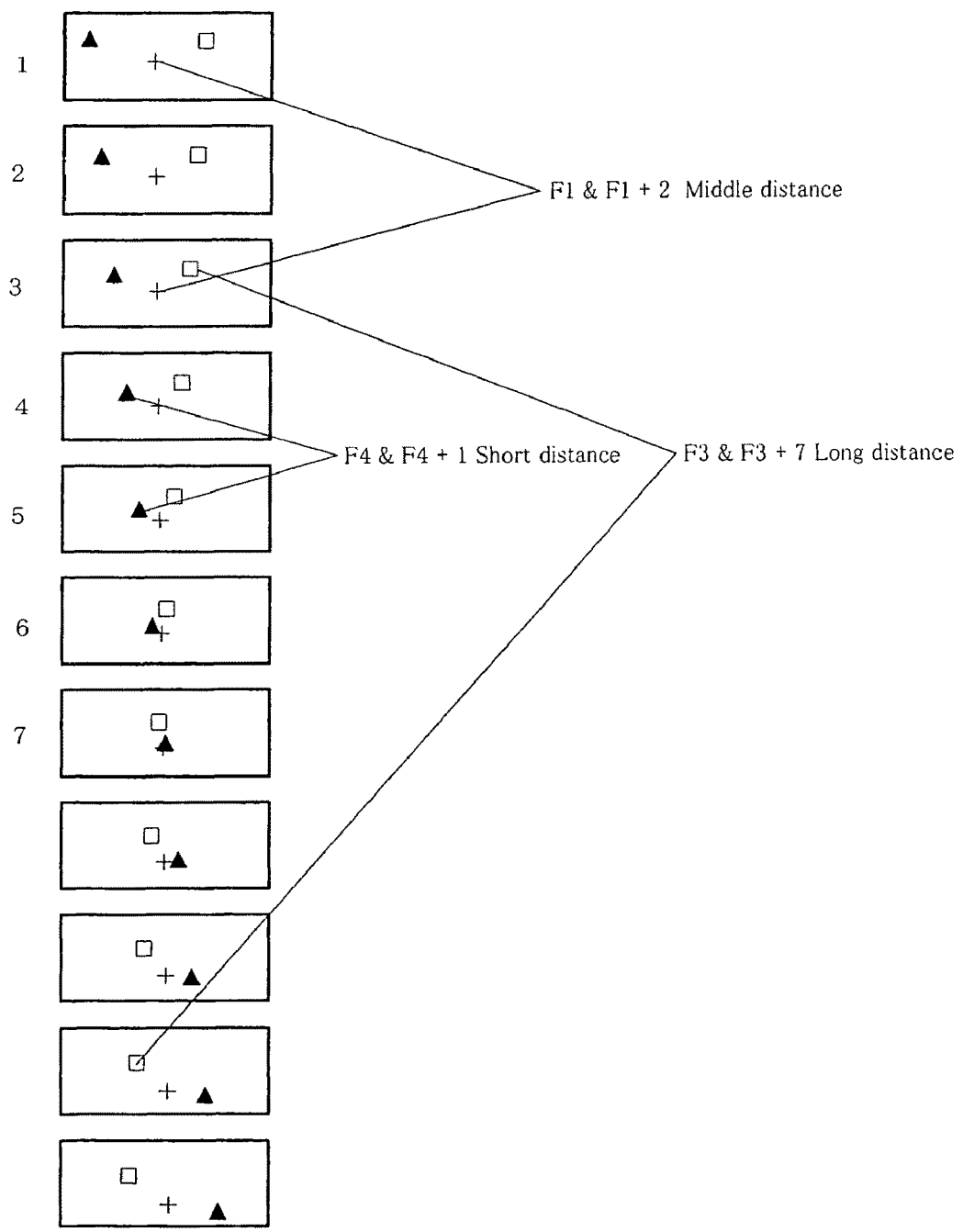
FIG. 12 is an explanatory view showing a case in which a plurality of feature points are set according to the distance between a camera and a characteristic point and a plurality of calculation are repeated in the CV calculating part according to one embodiment of the present invention.

Here, in the CV calculation in the CV calculation part 20, in order to obtain more accurate three-dimensional information on feature points and camera position quickly, as shown in FIG. 12, a plurality of feature points are set according to the distance from the camera to the feature point, whereby a plurality of calculation can be repeatedly conducted.

Specifically, in the CV calculation part 20, feature points, which are characteristics of an image, are automatically detected in an image. When obtaining correspondence of feature points in each frame image, two (nth and n+mth) image frames Fn and Fn+m are noted and used as a unit calculation. By appropriately setting n and m, unit calculation can be repeated.

m is an interval between frames. According to the distance from a camera to feature points in an image, feature points are classified into a plurality of steps, and m is set such that it becomes larger as the distance between the camera and the feature point is increased, and it becomes smaller as the distance between the camera and the feature point is decreased. The reason therefor is that, if the distance between the camera and the feature point is large, variance in position between images is small.

As for the classification of feature points by the m value, a plurality of steps of m value is set, and the m values are fully overlapped. N is allowed to increase continuously with the progress of an image, calculation is allowed to proceed continuously. In each step of progress of n and m, the same calculation is conducted a plurality of times for the same feature point.

By conducting a unit calculation based on a frame image Fn and Fn+m, between frames which are sampled for every m frames (frame drop occurs between frames), a precise camera vector is calculated for a long period of time, and in m pieces of frames between the frame image Fn and Fn+m (minimum unit frame), a camera vector is calculated simply for a short period of time.

If there is no difference in the precise vector calculation conducted for every m pieces of frames, the both ends of a camera vector of m sheets of frames overlap with a camera vector of Fn and Fn+m which has been subjected to high-precise calculation. Therefore, as for the minimum unit of m pieces of frames between Fn and Fn+m, a camera vector is obtained by simple calculation, and the scale adjustment can be conducted for continuing m pieces of continuous camera vectors such that the both ends of the camera vector of the minimum unit frame obtained by simple calculation can coincide with the camera vector of Fn and Fn+m obtained by the high-precise calculation.

In this way, by allowing n to increase continuously with the progress of an image, camera vectors are integrated by scale adjustment such that difference in camera vectors obtained by a plurality of calculations for the same feature point can be minimized, whereby a final camera vector can be determined. As a result, by combining a simple calculation while obtaining a highly precise camera vector having no differences, calculation operation can be conducted at a high speed.

As for the simple calculation, various methods can be selected depending on accuracy. For example, the following methods can be given. (1) About 10 feature points, which are the least possible amount, are used in the simple calculation in contrast to the highly accurate calculation in which as many as 100 or more feature points are used. (2) When the number of feature points is the same, if the feature points and the camera position are considered equally, numerous triangles exist, and equations in a number corresponding to the number of the triangles are established. By reducing the number of equations, calculation can then be simplified.

As a result, camera vectors are integrated by scale adjustment which is conducted to such that difference in feature points and camera position is minimized, and distance is calculated, feature points of which the difference is large are deleted, and re-calculation is conducted for other feature points according to need, whereby the accuracy of calculation at each feature point and camera position can be increased.

In addition, by conducting a high-speed simple calculation, real-time processing of a camera vector can be possible. In the real-time processing of a camera vector, calculation is conducted with frames in a number which is the least possible to obtain an intended accuracy and with a minimum number of feature points which are automatically extracted, whereby an approximate value of a camera value is obtained and displayed on the real-time basis. Subsequently, as images are accumulated, the number of frames is increased, the number of feature points is increased, more precise camera vector calculation is conducted, and the approximate value is replaced by a highly precise camera vector value, and this precise camera vector value is displayed.

Furthermore, in this embodiment, in order to obtain a more accurate camera vector, tracing of three-dimensional information (three-dimensional shape) can be conducted.

Specifically, in a three-dimensional tracing part 25, a camera vector obtained by the camera vector calculating part 23 and the difference minimization part 24 are related with an approximate camera vector. Based on the three-dimensional information (three-dimensional shape) obtained as part of an image generated in later processes, partial three-dimensional information contained in a plurality of frame images are continuously traced between adjacent frames, whereby automatic tracing of a three-dimensional shape is conducted.

Then, from the tracing results of the three-dimensional information obtained by this three-dimensional tracing part 25, a more highly accurate camera vector can be obtained in a high-accurate camera vector calculation part 26.

In the above-mentioned feature point extracting part 21 and the feature point correspondence processing part 22, feature points are automatically traced in a plurality of frame images. However, the number of tracing frames may be restricted due to disappearance of the feature points or the like. In addition, the images are two dimensional, and accuracy in tracing has its limit since the shape may vary during the tracing.

Therefore, by relating a camera vector obtained by feature point tracing with an approximate value, a three-dimensional information (three-dimensional shape) obtained in later processes are traced in each frame image, and a highly accurate camera vector can be obtained from the tracing path.

By tracing a three-dimensional shape, matching and correspondence can be performed in an accurate way. Since a three-dimensional shape does not change its shape and size according to the frame image, tracing can be conducted for a large number of frames. As a result, accuracy of camera vector calculation can be improved. Such an improvement in accuracy in camera vector calculation becomes possible since an approximate camera vector is already known by the camera vector calculating part 23 and the three-dimensional shape is already known.

If the camera vector value is an approximate value, difference in three-dimensional coordinates covering a large number of frames tend to accumulate since the number of corresponding frames is small in the feature points tracing. As a result, the difference becomes large for a long distance. However, if part of an image is cut, difference in an image which has been cut in a three-dimensional shape is relatively small, thus exerting a significantly small effect on change in shape and size. Therefore, comparison or tracing in a three-dimensional shape can be significantly advantageous as compared with the tracing of a two-dimensional shape.

In the case of tracing an image in a two-dimensional shape, tracing is conducted without avoiding the change in shape and size in a plurality of frames. Therefore, there are problems that the difference is large, no correspondence points can be found or the like. In contrast, tracing an image in a three-dimensional shape can be performed accurately, since change in shape is significantly small and, in principle, there is no change in size.

As for the data in a three-dimensional shape to be traced, three-dimensionally distributed feature points, a polygon surface obtained from the three-dimensionally distributed feature points or the like can be given.

It is also possible to convert the resulting three-dimensional shape to a two-dimensional image from a camera position, and to trace it as the two-dimensional image. Since the approximate value of the camera vector is already known, it is possible to convert by projection to a two-dimensional image from a viewpoint of a camera. As a result, a change in shape caused by the move of a camera viewpoint can be followed.

The camera vector obtained by the above-mentioned method can be displayed in a video image obtained by shooting by means of the all-surrounding video camera 11 in an overlapped manner.

Figure 13:
FIG. 13 is a view showing a case in which the path of a camera vector obtained in the CV data calculating part according to one embodiment of the present invention is displayed in a video image.

For example, as shown in FIG. 13, an image taken by a camera installed on a vehicle is plane-developed. Corresponding points in target surfaces in each frame image are automatically searched, and the surfaces are combined such that the corresponding points coincident, thereby to generate an image in which target surfaces are combined. These images are integrated and displayed on the same coordinate system Furthermore, the camera position and the camera direction are sequentially detected in this common coordinate system, whereby the position, direction and path of a camera can be plotted. The CV data show the three-dimensional position and the 3-axis rotation of a camera. By displaying the CV data in a video image in an overlapped manner, the CV value can be simultaneously observed in each frame of the video image. An example of an image in which the CV data is displayed in a video image in an overlapped manner is shown in FIG. 13.

If the camera position is accurately shown in a video image (CV video image), the camera position shown by the CV value in a video image (CV video image) becomes the center of the image. If a camera moves almost linearly, the CV values of all of the frames are displayed in an overlapped manner. Therefore, it is appropriate to display a position one meter just below the camera position, as shown in FIG. 13. Alternatively, it is appropriate to display the CV value at the height equal to the surface of the road, taking the distance from a camera to the road surface as a standard.

[CV Tag Video Image Display Device Provided with Layer Generating and Selecting Functions]

Next, a detailed explanation will be made on an embodiment of the CV tag video image display device provided with layer generating and selecting functions, in which the CV tag is generated in and attached to a CV video image for which the CV value is obtained as mentioned above, and various data which is linked to the CV tag is set, displayed, updated or the like, and a layer is generated and displayed such that the layer is overlapped with the original CV video image.

Figure 14:
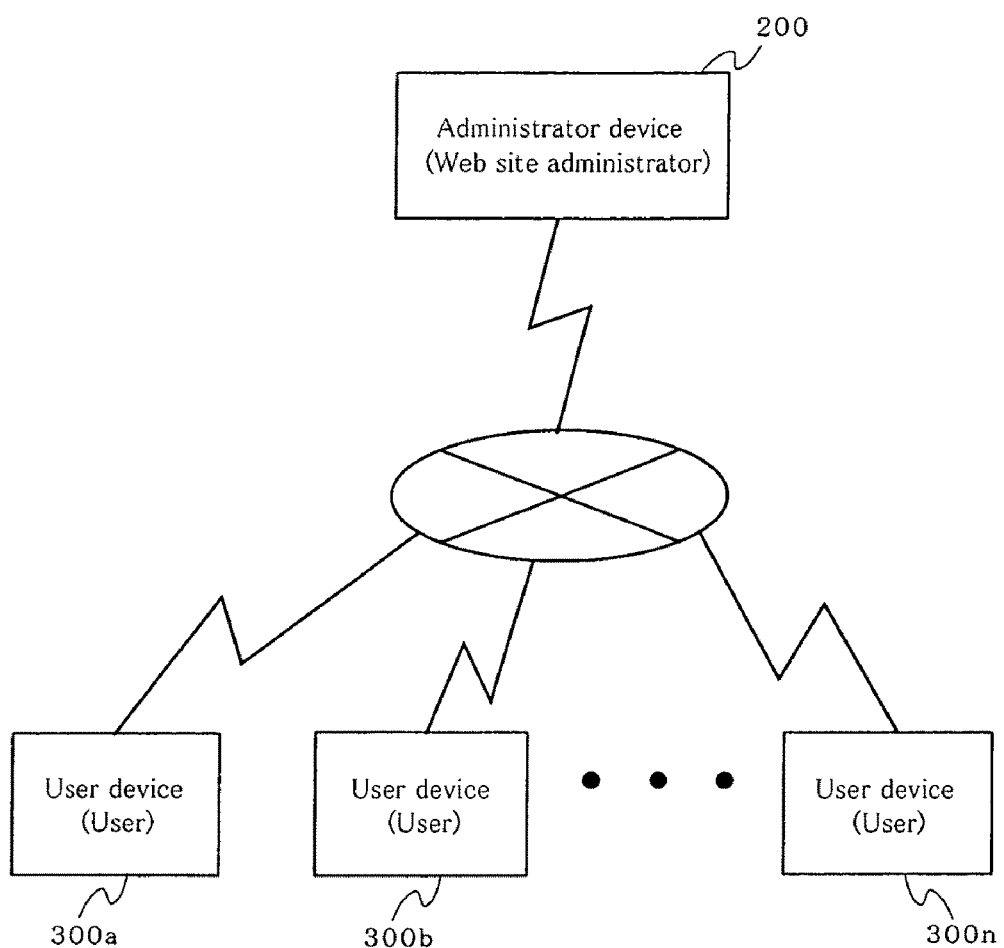
FIG. 14 is a block diagram showing a basic configuration of the CV tag video image display device provided with layer generating and selecting functions according to one embodiment of the present invention.

FIG. 14 is a block diagram showing a basic configuration of the CV tag video image display device provided with layer generating and selecting functions according to the first embodiment of the present invention. It shows a configuration of the CV tag video image display device provided with layer generating and selecting functions suitable for use under a network environment such as an internet, a LAN or the like.

As shown in FIG. 14, the CV tag video image display device provided with layer generating and selecting functions 100 according to this embodiment is a device for attaching a CV tag having three-dimensional information to an arbitrary object or a three-dimensional space in a video image of a predetermined object area, administrating various data of objects or the like which have been linked with the CV tag, and generating and displaying a plurality of layers overlapped with a video image. Specifically, the device in this embodiment is provided with an administrator device 200 of a web site administrator and a plurality of user devices 300 (300a, 300b . . . 300n) which are connected via an internet.

As mentioned above, in this embodiment, the following is realized. Specifically, an internet is actively utilized for data transmission and communication, and many and unspecified people participate freely via an internet. Many and unspecified users attach a CV tag to a CV video image provided by a web site administrator, write information into the CV tag, and further, display and generate arbitral layers, whereby mutual communication is attained. In addition, a web administrator can additionally conduct secondary data processing treatments such as totalizing and generating data.

[Administrator Device (Web Site Administrator)]

FIG. 15 is a functional block diagram showing a specific configuration of the administrator device 200 and the user device 300 which constitute the CV tag video image display device 100 provided with layer generating and selecting functions according to this embodiment.

The administrator device 200 is composed of information processing devices such as a server computer and, a work station to be provided by a web site administrator, and is provided with an operation control means composed of CPU, memory or the like, inputting means to which data can be inputted from outside, output display means such as liquid crystal displays, transmission and receiving means for conducting data transmission. The administration device 200 is connected to each user device 300 (300a, 300b . . . 300n) through an internet such that data communication is possible.

Specifically, as shown in FIG. 15, the administrator device 200 is provided with a CV video image storing means 201, a layer generating means 202, a layer storing means 203, a CV tag inputting means 204, a CV tag storing means 205, a CV tag searching means 206, a two-dimensional map storing means 207, a real-time image means 208 and an ID administrating means 209.

The CV image storing means 201 stores a CV video image obtained by adding to a video image of an arbitral object area a predetermined CV value indicating three-dimensional values of the position and posture of a camera during shooting.

As the object of a CV video image, a specific region such as roads, rivers and streets, the inside of a specific building or the like can be mentioned. Various things are present in this object area, and all of them can be an object of shooting. Therefore, a plurality of objects is present.

The CV video image storing means 201 stores and keeps a CV video image obtained by shooting an arbitral shooting object area and peripheral areas in advance, and then adding a CV value obtained by the above-mentioned CV calculation.

As mentioned above, a CV video image is an image in which three-dimensional coordinates of the position and posture of a camera used for shooting and the camera angle are obtained for each frame according to 6 variables. Since the position and posture of a camera is already known, three-dimensional coordinates of an object can be obtained from a plurality of frames.

Here, the CV video image storing means 201 can store, as the CV video image to be stored, a plurality of CV video images taken at different times for the same object area.

By doing this, it is possible to update the data of a CV video image, and distribute and display a CV video image in the time axis direction from past to present in the same region at the same location.

As a result, not only the data base of a CV video image can be administrated by expanding it in a wide range, but also can be administrated in the time axis direction, i.e. the time axis from past to present. As a result, a plurality of worlds by a plurality of layers (parallel world model) can be developed in the time axis direction.

The layer generating means 202 generate one or two or more layers having the same coordinate system as that of the CV video image to be overlapped.

Specifically, the layer generating means 202 generates, in accordance with inputting operation by the administrator device 200 and the user device 300, one or a plurality of imaginary or programmed layers for allowing other images to be displayed in an overlapped manner by allowing the viewpoint thereof to agree with that of the CV video image.

Then, the generated layers are related with corresponding CV image, and then stored in the layer storing means 204.

Here, although the layer is generally thought to be a two-dimensional surface, the layer according to the present invention is visually three-dimensional and means an imaginary three-dimensional space.

Figure 16:
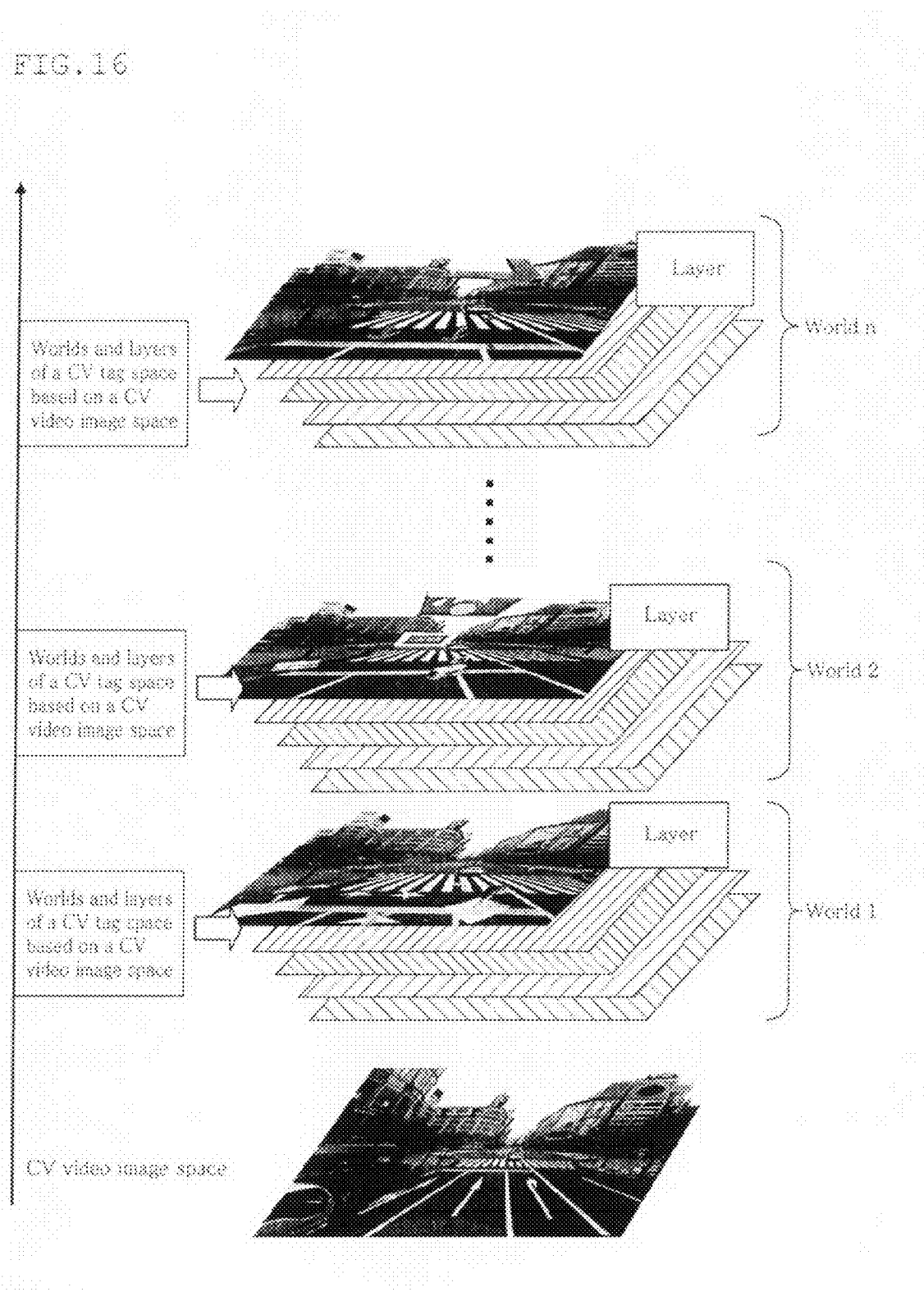
FIG. 16 is an explanatory view which diagrammatically shows the concept of a layer generated by the CV tag video image display device provided with layer generating and selecting functions according to one embodiment of the present invention.

FIG. 16 diagrammatically shows the concept of the layer in the present invention.

A CV video image is physically displayed on a display as a two-dimensional surface. However, a CV video image is originally an image which observes a plurality of substances in the three-dimensional space from a certain viewpoint. Therefore, a CV video image can be called an imaginary three-dimensional space.

In this sense, by displaying other images of which the viewpoint is the same as that of a CV video image to be displayed in an overlapped manner, the layers to be displayed in a manner overlapped with a CV video image are imaginary three-dimensional spaces since a CV video image originally shows a three-dimensional space as an image. Therefore, it can be said that layers are imaginary three-dimensional spaces.

That is, in this embodiment, one or a plurality of layers, which are two dimensional in respect of a program but visually three dimensional, are generated and provided. Therefore, the layers in the present invention mean two-dimensional surfaces on a display which becomes a three-dimensional space visually (see FIG. 16).

The layer generating means 202 generate layers which selectively display one or a plurality of layers of which the viewpoint is the same as that of the viewpoint of a CV video image and are displayed in a manner overlapped with a motion picture. This layer is, as mentioned above, visually a three-dimensional space. Therefore, a CV video image is used as an imaginary base, and a plurality of "three-dimensional worlds" composed of a plurality of layers are provided as shown in FIG. 16 (see worlds 1, 2 . . . n, in FIG. 16). This is significantly important as the feature of the present invention.

A user who owns a single layer has come to own a single "three-dimensional world" which is developed by himself or herself. A plurality of users freely and voluntarily generates or selects layers. As a result, they can participate, through an internet, in the CV tag video image display device provided with layer generating and selecting functions 100 according to the present invention, thereby allowing a web site administrator to provide a plurality of three-dimensional worlds in which a plurality of users can publish their own three-dimensional worlds on a web.

By generating in a layer a video image or CG which has been prepared by a user by himself such that the video image or the CG is agree with the CV value, and reconfiguring it in an overlapped manner with a CV video image provided by a web administrator, a video image or a CG image on the layer can be overlapped with a motion picture and synthesized to be displayed without discrepancies, and expressed as an image integrated with a motion picture.

Of course, in the future, a user himself or herself can prepare not only a layer but also a CV video image. In this embodiment, however, a CV video image as a base is prepared by a web site administrator and stored in the administrator device 200.

Since a CV video image is synthesized and displayed with CG on a layer, an all-surrounding motion image or a CG video image created from a motion picture is preferable as a motion picture.

ACV tag inputting means 204 synthesizes and displays a CV tag in an arbitral position in the above-mentioned CV video image or layer.

Specifically, in accordance with an inputting operation by the administrator device 200 or the user device 300, for a CV video image stored in the CV video image storing means 201 or an arbitrary object or a position in the layer stored in the layer storing means 203, the CV inputting means 204 directly attaches a CV tag in a CV video image, or arranges three-dimensionally a CV tag which can be identified by an arrow or the like such that the three-dimensional position of an object in a CV video image can be confirmed (see FIGS. 17 to 22).

Here, the CV tag has three-dimensional information corresponding to an arbitral object or a three-dimensional space in a CV video image, and serves to specify an object or a position in a three-dimensional space according to the three-dimensional information of the tag.

A CV tag which exchanges information like an icon can be attached to a CV video image having three-dimensional information. Furthermore, in a CV video image, an object in an image or a pixel itself has three-dimensional coordinates. Therefore, an object itself can be used as a tag.

In addition, a CV tag can be used in two different ways. Specifically, an actual image is used as a CV tag as it is or small CG can be attached as a tag. In this embodiment, either tag can be used.

In the CV tag inputting means 204, a CV tag is directly inputted to an arbitral object in a CV image in accordance with inputting operation by the administrator device 200 or the user device 300. That is, the CV tag inputting means 204 instruments each object three dimensionally using a CV video image, and a CV tag is arranged (attached) in the object in such a manner that the three-dimensional coordinates of the CV tag coincide with the three-dimensional coordinates of the object. Alternatively, a CV tag is attached in the vicinity of an object in such a manner that the object is not concealed by the CV tag.

Specifically, at first, in an object in a CV video image displayed or in the vicinity thereof, the CV tag inputting means 204 designates in the display a CV tag which identifies the object. The designation can be performed by inputting means such as a mouse. If there is a plurality of objects, a plurality of designations can be possible.

As for the shape or the like of a CV tag, it is possible to select from candidates including icons, CG, actual images or the like which differ in design, shape and configuration.

The range in which the CV tag is arranged can be restrictively designated either two dimensionally or three dimensionally. Specifically, for example, a plurality of two-dimensional surfaces is prepared, and a CV tag is restrictively arranged in these surfaces. Alternatively, the position of a CV tag is restrictively designated in a three-dimensional range.

Subsequently, the CV tag inputting means 204 obtains by calculation the three-dimensional coordinates of the position of a CV tag in a CV video image which has been designated by a mouse or the like. It is possible to perform fine adjustment of the position, posture or the like.

Then, the thus obtained three-dimensional coordinates are fixed as the coordinates of a CV tag, and an object is three dimensionally designated and related to a CV tag.

Finally, the so-obtained CV tag is inputted and registered. The CV data which has been registered is stored in the CV tag storing means 205, which will be mentioned later.

The setting of the coordinates of a CV tag is completed by the above-mentioned process.

Then, the CV tag inputting means 204 opens a CV tag which has been attached to an object, and then writes and registers to a linked file various data including images or texts relevant to an object to be administrated.

Specifically, when a CV tag is clicked (opened), the CV tag inputting means 204 develops a screen for writing various data, and records the data in the CV tag storing means (data base) 205 if prescribed information is written according to this format.

First, the CV tag inputting means 204 stores the attribute or communication contents to be written to a CV tag. As for the attribute or communication contents to be recorded, recorded data for administration, photographs, drawings or the like can be mentioned (see FIG. 17).

Furthermore, the CV tag inputting means 204 registers the position, posture and kind of a CV tag so that the CV tag can be link-displayed in other CV video images or maps. For example, the position, posture and kind of a CV tag are registered so that the CV tag can be link-displayed in other CV video images or maps including three-dimensional maps, aerial video images, ground video images taken in the past, images of the inside of a building, and conceptual CG.

The contents of a CV tag to be registered can be confirmed. If need arises, the contents or settings of a CV tag can be cancelled.

Data inputting of a CV tag is completed by the above-mentioned process.

The CV tag storing means 205 stores the CV tag which is inputted and set by the CV tag inputting means 204 together with the predetermined relevant information and various data.

That is, the CV tag storing means 205 serves as data base in which a prescribed CV tag, which is synthesized and displayed in a CV video image as mentioned above, is stored together with various data.

The various data to be registered in the CV tag storing means 205 means all of the data relating to an object in a CV video image. For example, if a CV video image is intended to be used for store guidance, information about stores or firms in the area (information including industrial classification, store name, merchandises) is registered as various data. If a CV video image is intended to be used road management or car navigation, an indicated speed limit or the like is registered to a CV tag attached to a road sign (CG of a road sign).

Once the above-mentioned various data is written in the data base and registered in the CV tag storing means 205, then, a CV tag can be displayed and browsed by the user device 300 together with a CV video image. By opening (clicking) an arbitrary CV tag, the registered information is allowed to be displayed on the screen. In this way, a CV tag functions as an icon for opening and displaying predetermined information of an object to be administrated.

As for various data and information relating to a CV tag, it is possible to open a CV tag and write to a linked file, various data including images or texts relating to on object indicated by the CV tag. In addition to the case where a web site administrator directly writes into the CV tag storing means 205, various data relating to a CV tag can be written to the CV tag storing means 205 in the user device 300.

The CV tag retrieving means 206 retrieves and extracts a CV tag and relevant information which have been stored in the CV tag storing means 205.

That is, the CV tag retrieving means 206 retrieves the CV tag storing means 205 based on information such as letters, coordinates and attributes which are directly inputted to the administrator device 200 or inputted or transmitted by the user device 300, and extracts a corresponding CV tag or relevant information.

As for a CV tag which has been extracted as a result of retrieval, a CV tag itself which shows an object in a CV video image or an image of an object in a CV video image is shown three dimensionally without discrepancies on a CV video image as a motion picture as an icon with three-dimensional coordinates which have visual effects such as a change in color and a flash, and can be displayed and perused by a person who performs retrieval.

Specifically, retrieval of data base (CV tag storing means 205) by the CV tag retrieving means 206 is performed by letter retrieval, coordinate retrieval, attribute retrieval or the like, for example. It is also possible to retrieve an object which has been already registered or retrieve an un-retrieved object. A CV tag or an object which has been extracted by retrieval is displayed by blinking or flashing on a CV video image, whereby the three-dimensional position thereof is shown.

For example, when town guide or store guide is intended, if the letter "restaurant" is retrieved, a video image of a restaurant or a tag attached thereto in a CV video image is displayed by lightening and flashing. In the case of data base corresponding to road management or car navigation, if the letter "40 km speed limit" is retrieved, this road sign is displayed in a bright color in a CV video image. If longitude and latitude are retrieved by inputting in numerals, an image is moved to a place to a position indicated by this longitude and latitude, and the position is then indicated by an arrow. If the "40 km speed limit" is retrieved, the shoulder of a road of which the speed is limited to 40 km is flash-displayed, and the corresponding range is indicated.

Here, the letter retrieval is performed based on relevant information/various data stored in the CV tag storing means 205. In addition, it can be conducted by automatically recognizing letters in an image. Furthermore, as for the retrieval by coordinates, since a CV video image to be used as a map has an absolute coordinate, it is possible to retrieve by identifying coordinates even in the case of a motion picture.

It is needless to say that various data which has been registered can be retrieved. However, as for an object to be administrated which has not been registered, such an object can be retrieved by image retrieval technology in which the object is retrieved from an image or by object recognition technology.

For example, in the case of traffic signs, images of a sign of "one way" are prepared. By performing retrieval according to the image of this "one way" sign, all of the one way sings in the images are retrieved, and the position thereof can be indicated.

For the retrieval of an object to be administrated which has not been registered, object recognition technology is necessary. In this case, retrieval takes a time. Therefore, retrieval can be performed quickly by retrieving from various data relating to an object to be administered which has been inputted and registered in advance.

The two-dimensional map storing means 207 stores a two-dimensional map corresponding to a CV video image stored in the CV video image storing means 201. The map which has been stored in the two-dimensional map storing means 207 is read out by a two-dimensional map display means 305 of the user device 300, which will be mentioned later. The map which has been read out is then displayed in a synchronized manner with a corresponding CV video image (see FIGS. 18 to 22).

It is preferred that the map stored in the two-dimensional map storing means 207 be provided with a map of which the scale is larger than that of a corresponding CV video image. That is, a CV video image to be stored in the CV video image storing means 201 has a smaller scale than that of a map showing a corresponding object area.

The scale is not a crucial problem here. That is, in the case of maps having an almost similar scale, the coordinates thereof can be integrated according to purpose. A small-scale video image is not limited to a CV video image. Specifically, it is possible to allow a two-dimensional map to have a small scale, while allowing a CV video image to have a large scale.

Furthermore, not only a two-dimensional map, but also a three-dimensional map can also be used. There is no essential difference between a map and a CV video image. CG may also be used. Anything can be integrated by coordinates as long as it has coordinates. That is, a map may be either two dimensional or three dimensional. If a map is a three-dimensional map, it may be considered as CG. In this case, integration of coordinates means integration of coordinates of CG and those of a CV video image. In addition, it also means integration of coordinates of a CV video image with those of another CV video image. In this case, CV video images having the same scale may be integrated, or a ground video image may be coordinate-integrated with an image.

The real-time image means 208 captures a real-time image corresponding to a CV video image which has been stored in a CV video image storing means, and synthesizes and displays it in the CV video image.

Specifically, the real-time image means 208 captures a real-time image by means of a video camera mounted on a moving vehicle or the like, and then conducts the above-mentioned CV calculation for this real time image, thereby to obtain a real time CV video image. That is, the real time imaging means serves as the above-mentioned CV calculation part (see FIGS. 1 to 13).

A real time image is used not only just as a monitor. By directly conducting CV calculation or by positioning a real time video image with a CV video image map which has been prepared in advance, thereby to obtain a CV value. A real time CV video image can be used in various ways.

An ID administrating means 209 records and identifies the ID number of all of the user devices 300 which are present on a network and makes an access to the administrator device, and distributes various data such as a CV video image, a layer, a CV tag and a two-dimensional map to the corresponding user device 300.

Users can be divided into a plurality of groups, i.e. users of which the ID has been registered and users of which the ID has not been registered. Users are authorized according to the ID registration status. The ID administrating means 209 corresponds to users according to the authority, and record the results.

If users have to pay, administration by the ID managing means 209 becomes important.

The layer according to this embodiment can be freely generated by a user. Therefore, by incorporating a real time image into the layer or by displaying CG generated by the real time information, it is possible to distribute and display a real time image which can be observed by other users on the real-time basis. For example, a house in which an aged person is living alone is stored in a CV video image data base, and a device showing the position of the aged person is installed. By doing this, an observer can observe the position of the aged person on the real-time basis, whereby the safety of the aged person can be ensured. In this way, it can enhance the quality of the care for old people.

Furthermore, by installing in stores or the like a device detecting the move of people after the close of the store, a night monitoring video image can be observed on the real-time basis in the CV video image according to the present invention.

[User Device (User)]

The user device 300 is composed of an information processing device such as a personal computer and a mobile communication terminal provided by a general user who uses an Internet, and is provided with a calculation control means composed of a CPU, a memory or the like, an inputting means which allows data inputting from outside and output display means (display 300a) such as a liquid crystal display and CRT, and transmission and receiving means for data transmission. The user device 300 is communicatably connected with the administrator device 200 through an internet.

Specifically, as shown in FIG. 15, the user device 300 is provided with a display 300a, a CV video image selecting and displaying means 301, a layer selecting and integrating means 302, a CV tag selecting and displaying means 303, a tag information selecting and displaying means 304, a two-dimensional map displaying means 305 and a camera position displaying means 306.

The display 300a is display means which display a predetermined image. In this embodiment, according to inputting operation of the user device 300, a CV tag, a two-dimensional map or the like which have been set on a CV video image or a layer, which will be mentioned later, are displayed (see FIGS. 16 to 22).

The CV video image selecting and displaying means 301 selects and receives a desired CV video imagefrom the CV video image storing means 201 of the administrator device 200, and displays the CV video image on a display 300a of the user device 300 (see FIGS. 17 to 22).

Since the amount of CV video image data is large, it takes a lot of time to distribute a CV video image by a common communication network. Distribution is fully possible by slightly degrading the quality of a video image. However, if the user device captures an image while maintaining the quality thereof high, it is better to capture an image in advance by other methods. As for the other methods, for example, only an image is received in advance by taking a long period of time utilizing a hard-disk, a DVD, or communication line of the above-mentioned network. In this case, it is not necessary to transmit a CV value in advance, and a CV value can be received together with a layer at the time of display.

The layer selecting and integrating means 302 allows a desirable layer corresponding to a CV video image displayed by the CV video image selecting and displaying means 301 to be generated in the layer generating means 202 of the administrator device 200, or receives from the layer storing means 203 a desirable layer which has already been generated, and displays this layer in an overlapped manner after integrating the coordinates thereof with those of a CV video image (see FIG. 16).

However, a layer is a three-dimensional space, and it cannot be seen even when displayed in an overlapped manner with a CV video image. That is, the layer in the present invention means a three-dimensional space in which the coordinates thereof are overlapped with a CV video image to allow next CV tag to be displayed.

The characteristic feature of the present invention resides in that a plurality of such layers are prepared to allow users to select or generate layers freely and that the layers are then placed in the administrator device such that these layers can be distributed to other users and shared among users, whereby the world can be infinitely expanded.

For CV tags classified for each layer, the CV tag selecting and displaying means 303 allows a CV tag to be synthesized and displayed on the display 300*a* by designating a desired three-dimensional position of a CV video image and/or a layer shown on the display (see FIGS. 17 to 22).

Specifically, the CV tag selecting and displaying means 303 allows a CV tag to be displayed in a CV video imaged displayed by the CV video image display means 301. If an image frame moves as a motion picture, the CV tag selecting and displaying means 303 displays a CV tag while maintaining the three-dimensional positional relationship of a video image and a CV tag. The CV tag selecting and displaying means 303 also opens a CV tag to display the contents thereof.

Figure 17:
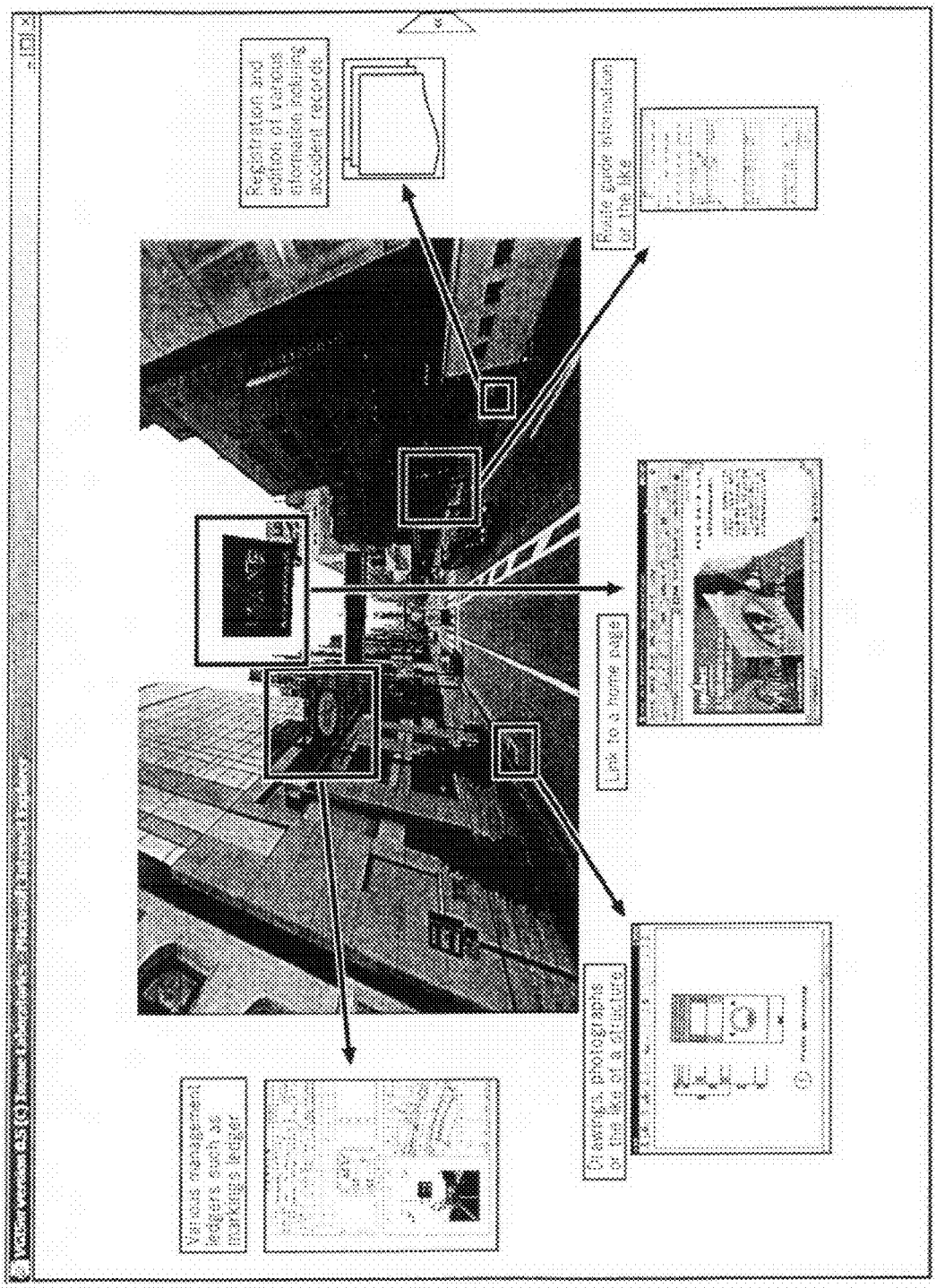
FIG. 17 is an explanatory view showing one example of a CV video image/layer and a CV tag displayed by the CV tag video image display device provided with layer generating and selecting functions according to one embodiment of the present invention.

In this embodiment, a CV tag is arranged in a CV video image to be served as the doorway of information in a CV video image (see FIG. 17).

As for the manner of arranging a CV tag, a CV tag may be arranged such that it overlaps an object or at an imaginary position where an object is identified, which is slightly away from the object, whereby a CV tag serves as the doorway of information.

The characteristic feature of the present invention resides in that a CV tag which has been classified for each layer is attached to an object in a video image and the CV tag is then used as the doorway of information relating to the object.

As for a CV tag, in addition to attaching CG to an actual video image, an actual video image can be used as a CV tag as it is. For an object in a CV video image, the three-dimensional coordinates thereof can be obtained from an image, those coordinates and peripheral coordinates can be used as a CV tag.

The characteristic of using an actual video image as a CV tag as it is resides in that all of objects in an image can be used as a CV tag. By allowing the coordinate system of an image to be the same as that of the coordinate system of a CV tag, the three-dimensional coordinates themselves serve as the position of a tag, and can be arranged as an invisible tag. However, if the position of a CV tag is a pinpoint position, retrieval will be difficult. Accordingly, it is preferred that a range be designated two dimensionally or three dimensionally, and it is preferred that this designated range be a tag region.

In the case of a CV tag composed of an actual video image, since an actual video image itself is used, a tag is invisible. Therefore, a tag may not be an obstacle in observing a video image, which is an advantageous as compared with the CG method. In order to designate or retrieve the tag position in a CV video image, it is necessary to perform three-dimensional instrumentation of an image each time. The CG method is superior in this respect.

In the case of a CV tag composed of CG, CG as a tag is arranged at a position where three-dimensional instrumentation is performed. In order to arrange, three-dimensional instrumentation is performed as in the case of an actual video image. In the case of reading out or retrieving, since CG already has three-dimensional coordinates, the three-dimensional coordinates can be obtained by directly clicking CG without performing three-dimensional instrumentation again, which facilitates processing. A CV tag composed of an actual video image is advantageous as compared with a CV tag composed of an actual image.

Unlike the case of a CV tag composed of an actual video image, a CV tag composed of CG is visible in a video image, which makes video image observation difficult. Often, it is more advantageous that a CV tag can be seen in a video image. It is possible to make CG transparent. In this case, even though it is invisible, the three-dimensional coordinates of CG can be obtained by clicking, whereby a tag can be identified.

Accordingly, in the CG method, not in the actual video image method, a tag itself can be hidden in a video image. Irrespective of being transparent or visible, CG, which is a CV tag arranged in a CV video image, already has three-dimensional coordinates. Accordingly, it is not necessary to instrument the three-dimensional coordinates at this site. Therefore, in calling or retrieval, as compared with the actual video image method, the CV method is more advantageous.

The tag information selecting and displaying means 304 designate the above-mentioned CV tag which is synthesized and displayed in a CV video image, and displays information relating to the CV tag on the display 300*a* in such a way that they can be edited, classified, integrated, retrieved, deleted or the like.

Specifically, the tag information selecting and displaying means 304 is means for reading, from a CV tag storing means 205 of the administrator device 200, and administrating data of an object corresponding to a CV tag, by selecting a CV tag, or by touching, through a touch screen, an object in a CV video image displayed on the display 300*a* or by clicking a CV tag by means of a mouse or the like to select a CV tag.

The information and data relating to a CV tag is automatically or manually retrieved by means of the above-mentioned CV tag retrieving means 206.

As mentioned above, identification of a desired object in a CV video image is completed by retrieval or by directly clicking an object in an image.

The two-dimensional map display means 305 receives a desired two-dimensional map from the two-dimensional map storing means 205 of the administrator device 200 and displays the received map.

In addition, the camera position display means 306 displays on the displayed two-dimensional map the shooting position of a corresponding CV video image and the moving direction of a camera. The CV video image selecting and displaying means 301 receives from the CV video image storing means 301 a CV video image corresponding to an arbitral point designated in the displayed two-dimensional map, and displays the CV video image.

Specifically, the two-dimensional map display means 305 performs synchronized display of the corresponding map and the CV video image (see FIGS. 18 to 22).

The two-dimensional map display means 305 integrates the coordinates of a CV video image and the coordinates of the corresponding two-dimensional map, and displays on the display 300a a two-dimensional map and a CV video image. Furthermore, the two-dimensional map display means 305 displays a CV tag such that it is synchronized with a CV video image on the map, whereby the display of attributes or the like can be performed on a display 300a by clicking the CV tag of a CV video image and the CV tag of a two-dimensional map.

As a result, in administrating a CV tag, it is possible to not only display a CV tag on a CV video image but also attach a tag to a map of which the coordinates are integrated with those of a CV video image. When a map and a CV video image are linked, a CV tag can be displayed on a map such that it is synchronized with a CV video image.

As for the link of a video image and a map, the technology of the "retrieval device for video device for displaying current status of road and river or the like" (Japanese Patent No. 3099103) can be used.

In the above-mentioned "retrieval device for video device for displaying current status of road or the like", the map and the camera position are expressed in points and they correspond two dimensionally (free degree: 2). In the present invention, a map and a video image correspond in respect of the three-dimensional position and posture, that is, they correspond in 6 free degrees. Therefore, they can be overlapped. That is, it is possible to display in such a manner that a three-dimensional map and an image completely correspond.

If a map is a two-dimensional map, it is preferred that a tag to be attached to a map be a two dimensional tag. If a map is a three-dimensional map, it is preferred that a tag to be attached to a map be a three-dimensional tag.

In FIGS. 17 to 22, one example of a CV video image, a CV tag, a two-dimensional map or the like which are generated and displayed on a display of the CV tag video image display tag provided with layer generating and selecting functions according to this embodiment.

As mentioned above, a motion picture can be treated three dimensionally by CV calculation, whereby three-dimensional information of an arbitral object or a three-dimensional space can be obtained. A CV tag can be freely attached to them, allowing layers to be generated and set.

In a CV video image to which a CV value is added, in addition to a CV tag, CG can be synthesized separately. The technology of synthesizing a CV video image and CG is proposed in JP-A-2005-122315 according to the inventor of the present application.

FIGS. 17 to 22 show display examples of a CV video image/layer and a CV tag which are generated and displayed under an internet environment by the CV tag video image display device provided with layer generating and selecting functions according to this embodiment.

As shown in these figures, in a CV video image published under an internet environment, a CV tag is allowed to be set and displayed together with various relating information (FIG. 17). By designating and clicking each tag, it is possible to display relevant information, as well as to display other web pages to which the CV video image is linked.

Figure 18:
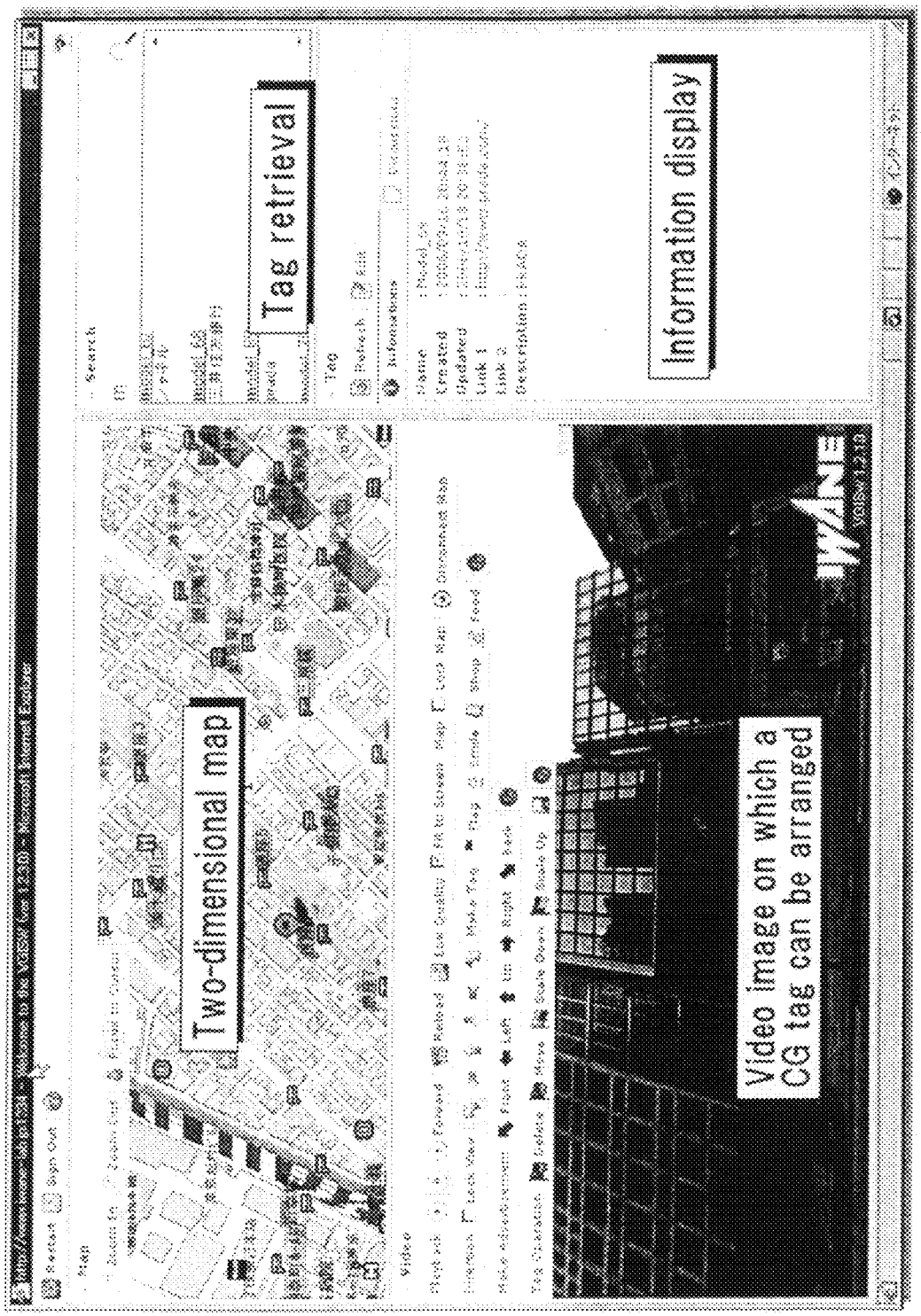
FIG. 18 is an explanatory view showing one display example of a CV video image/layer and a CV tag generated and displayed under an internet environment by the CV tag video image display device provided with layer generating and selecting functions according to one embodiment of the present invention, in which a CV image/layer and a two-dimensional map are displayed in a synchronized manner.

In addition, it is also possible to display on the same screen a two-dimensional map corresponding to a CV video image in a synchronized manner (FIGS. 18 to 22). As a result, tag information registered in a CV video image and a map can be retrieved (FIG. 18).

Figure 19:
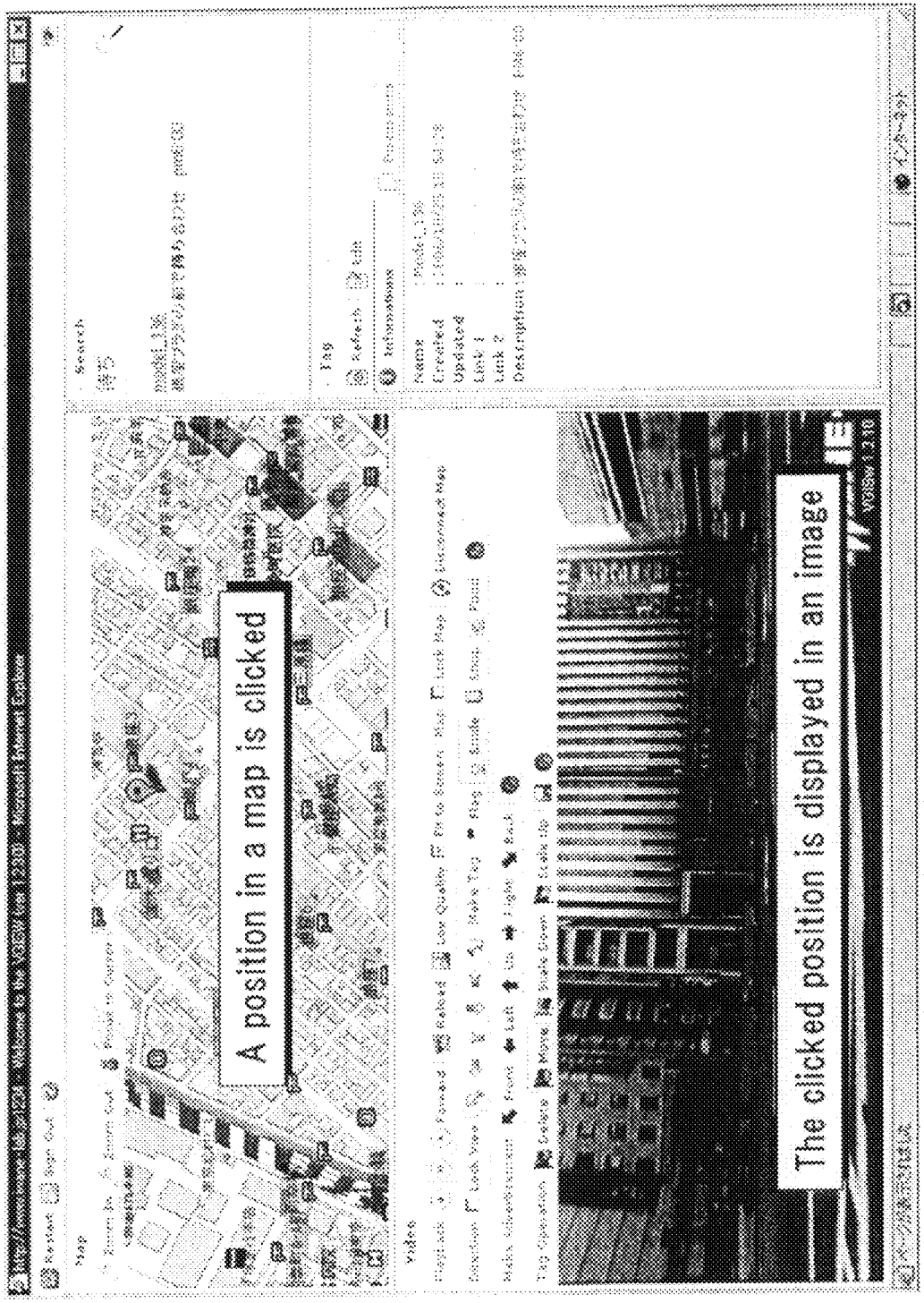
FIG. 19 is an explanatory view showing one display example of a CV video image/layer and a CV tag generated and displayed under an internet environment by the CV tag video image display device provided with layer generating and selecting functions according to one embodiment of the present invention, in which a position in a two-dimensional map is designated to display the corresponding CV video image/layer.
Figure 20:
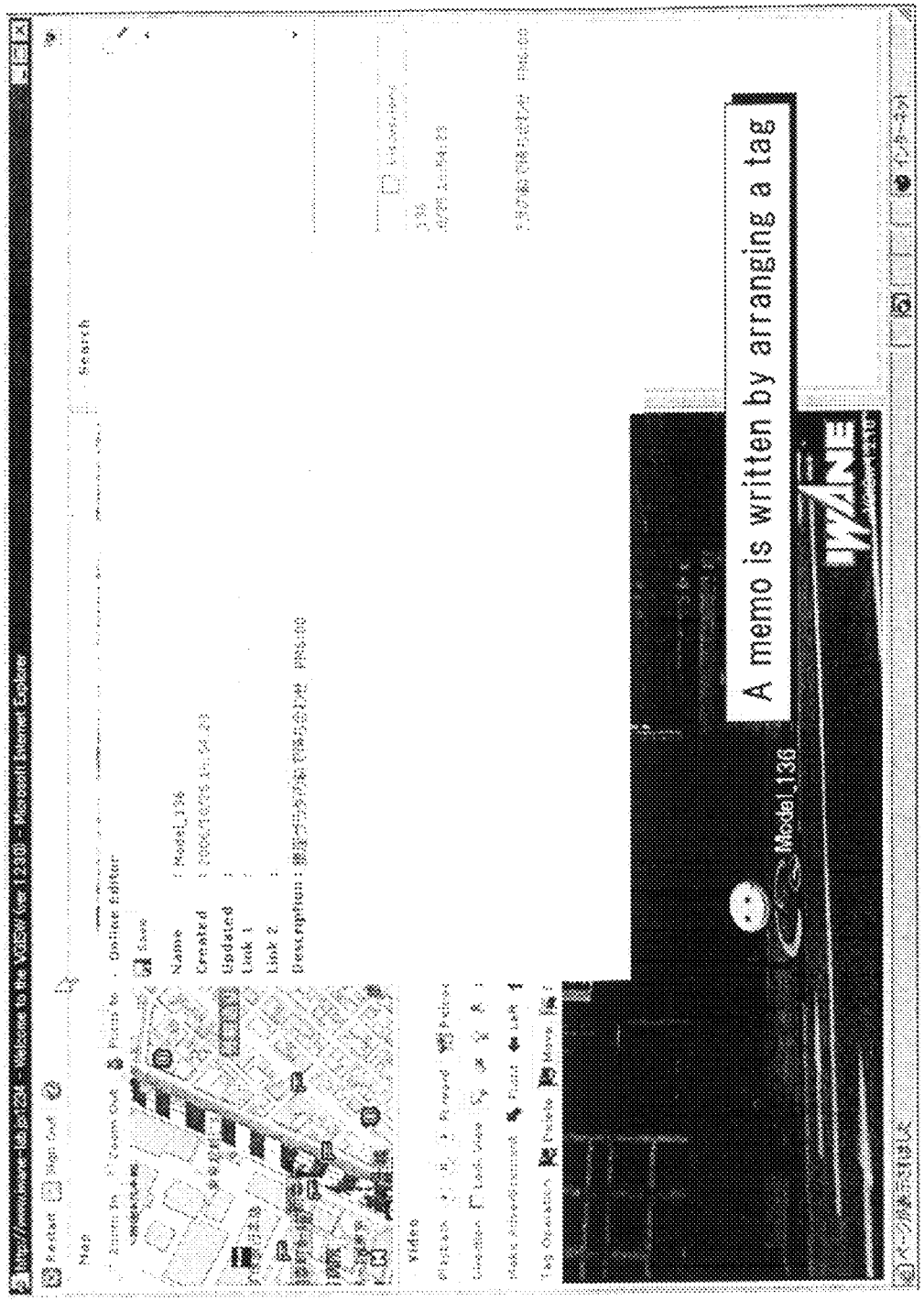
FIG. 20 is an explanatory view showing one display example of a CV video image/layer and a CV tag generated and displayed under an internet environment by the CV tag video image display device provided with layer generating and selecting functions according to one embodiment of the present invention, in which a tag is inputted to an arbitrary position of a CV image/layer and information is written to the tag.

Furthermore, by designating an arbitral point in a map, a corresponding video image can be displayed (FIG. 19). A CV tag can be inputted to an arbitral point in a CV video image, and information relevant to the tag can be inputted and registered (FIG. 20).

Figure 21:
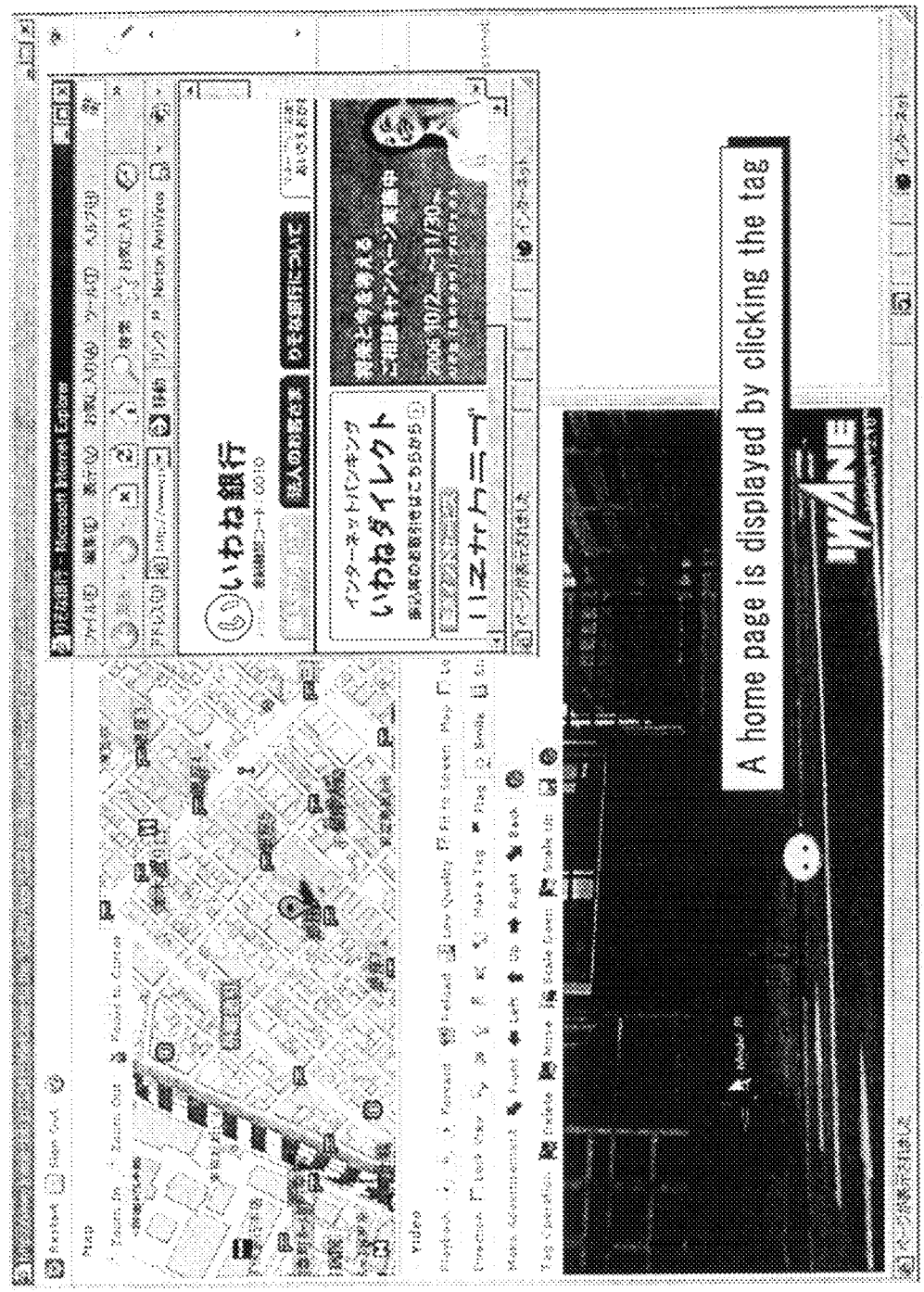
FIG. 21 is an explanatory view showing one display example of a CV video image/layer and a CV tag generated and displayed under an internet environment by the CV tag video image display device provided with layer generating and selecting functions according to one embodiment of the present invention, in which a tag in a CV video image/layer is designated to display a web page to be linked.
Figure 22:
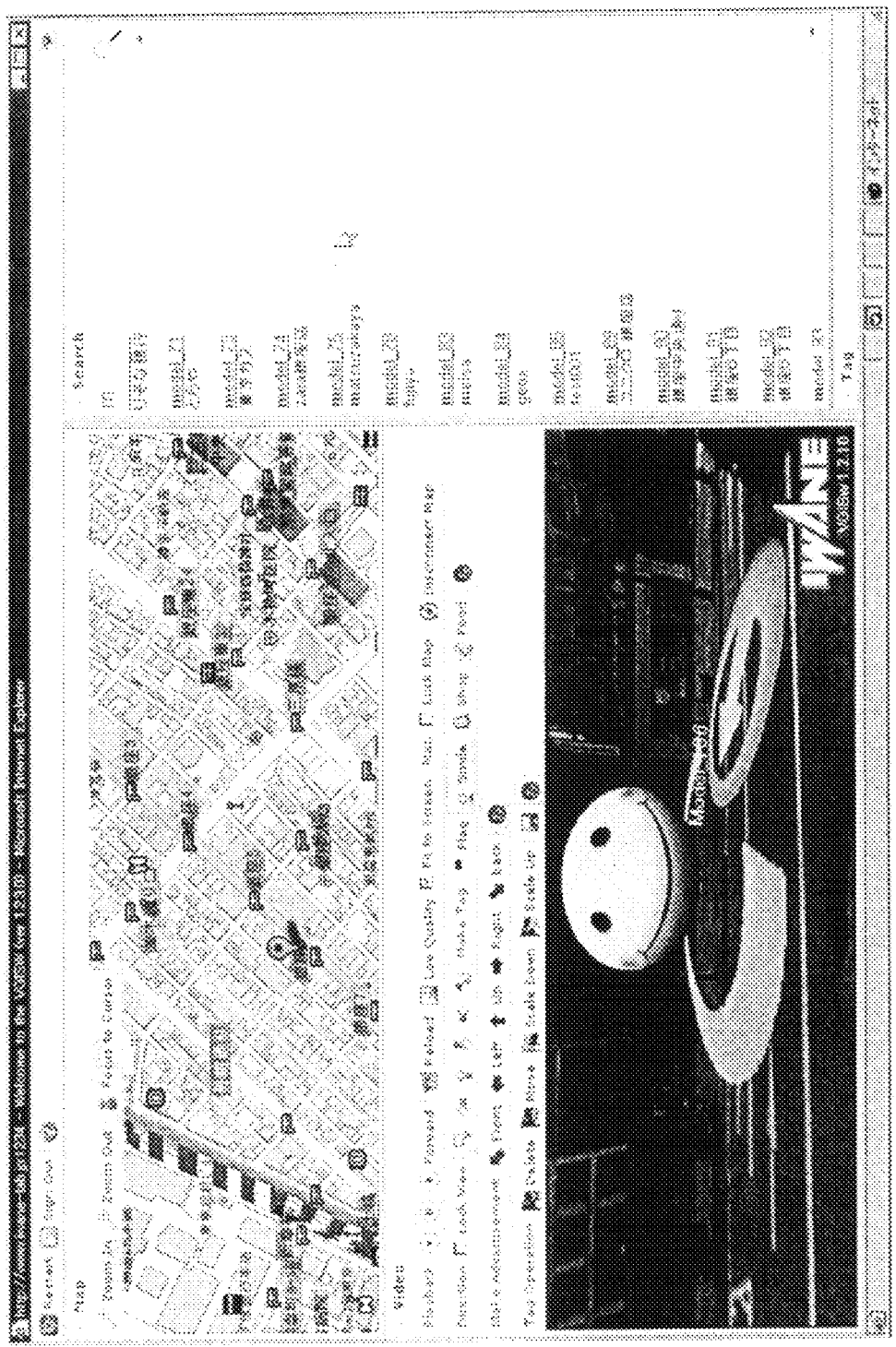
FIG. 22 is an explanatory view showing one display example of a CV video image/layer and a CV tag generated and displayed under an internet environment by the CV tag video image display device provided with layer generating and selecting functions according to one embodiment of the present invention, in which a tag registered in the displayed CV video image/layer is free-word retrieved, and the position of the tag is displayed in the video image.

In addition, by designating and clicking a tag in a CV video image, other linked web pages are displayed (FIG. 21). It is also possible to retrieve tags registered in a displayed CV video image by free words, whereby an image at the position of the tag can be displayed (FIG. 22).

As mentioned above, a CV video image/layer/CV tag provided by the administrator device can be displayed and browsed by the user device 300 of general users through an internet. Users can attach a CV tag in a desired shape or the like to an arbitral address, a location, a store, a restaurant, a lunch counter, etc, can write to a CV tag prescribed attributes information, etc, and can read/display or the like of the written attribute information, etc.

In order to realize the CV tag video image display device provided with layer generating and selecting functions 100 as mentioned above, in this embodiment, a server (administrator device) installed in an internet environment is allowed to have various functions, a CV video image is provided on the administrator device so as to allow the terminal (viewer) of the user device to display only a two-dimensional video image, and all of the advanced works including CV calculation and three-dimensional instrumentation as mentioned above are allowed to be performed by the administrator device 200. By doing this, the terminal of the user device 300 may be equipment with functions which are as low as possible. As a result, a wide range of unspecified number of general users is allowed to utilize the CV tag technology of the present invention. Needless to say, by allowing the user device 300 to have a number of processing functions, it is possible to lighten the burden imposed on the administrator device 200 (see FIG. 23, which will be mentioned later).

In this way, according to this embodiment, all of objects in a CV video image can be shared on a web, whereby a communication tool in which a large number of people can participate is realized.

As a result, not only an administrator but also an unspecified large number of people can attach a CV tag, or share a CV tag, share information and provide an environment in which people can participate freely, whereby the conventional internet environment changes drastically.

Here, it is also possible to separate a CV tool to be published and a CV tool to be remained unpublished, and the administrator has the option.

[Mutual Information Exchange by a Plurality of Users]

According to the CV tag video image display device provided with layer generating and selecting functions 100 of this embodiment, each of a plurality of layers is selectively synthesized with a CV video image by a plurality of users through an internet. As a result, synthesized CV video images are generated in a number corresponding to the number of layers.

That is, three-dimensional worlds in a number corresponding to the number of layers are generated.

Although a motion picture served as a base (CV video image) is one, the number of layers to be overlapped and displayed thereon is, in principle, limitless. It is apparent that there are no restrictions on the number of layers to be generated. This means that a plurality of worlds by a plurality of layers is generated to establish a limitless number of three-dimensional worlds. This leads to the creation of a parallel world model, which is the significantly excellent feature of the present invention.

By selecting layers, a user can select the world which is suited to him or her.

For the convenience of explanation, users are classified into User A and User B. User A is a user who does not always have his or her own layer, and only selects and observes a layer which is prepared and published by other users (User B). User B is a user who owns and administrates his or her own layer.

User A does not necessarily have his or her own layer, and can select and observe a layer which is prepared and published by User B.

As a matter of course, User A and User B are able to conduct bi-directional information exchange or communication. A plurality of published layers is displayed simultaneously. Unpublished layers are utilized in a closed world which is created by the parties concerned. In addition, a plurality of users can perform mutual information exchange or communication on the same layer.

Here, each layer is generated individually. Alternatively, a plurality of layers is synthesized, and the synthesized layers are integrated with a motion picture and displayed. In principle, there are no restrictions on the combination or the number of layers.

The form of mutual information exchange on the layer will be explained.

In each layer, a CG icon (tag), which conforms to a CV value (three-dimensional position and posture in each frame) of a CV video image and is integrated with a motion picture, is prepared. This CG icon can be provided on a layer. It is also possible to use part of an actual image as an actual image icon (no tag).

An icon can be prepared and set separately in each layer. Here, CG with icon functions is called a tag. It is important that a tag has icon functions, and a tag is not necessarily CG. A tag may be a small actual image, a motion picture, an animated CG or a CG animation.

For the convenience of explanation, it is assumed that CG be arranged on a layer. In idea, a layer is convenient. By allowing CG itself to have attributes of a layer, it is possible to attain the same effects as those attained by a layer structure, even though a layer is not particularly assumed.

In the system of the present invention in which a plurality of users can participate in and use through an internet or the like, almost no difference is present between a web administrator and a user in using the system of the present invention. For the system administration and responsibility, a web site administrator is distinguished from a user. However, if the characteristic feature of the present invention is further developed, the difference between a web administrator and a user gradually disappears and all of the participants become users in the long run, and the system of the present invention then becomes a site which is run by users.

Therefore, the administrator device 200 of the web administrator and the user device 300 of the user can have the completely same configuration.

However, since a web site administrator at first prepares a device displaying such plurality of three-dimensional worlds, in the following, an explanation is made while distinguishing a web site administrator from a user.

A more detailed explanation is made on the above-mentioned difference in users (User A, User B).

User A is defined as a user who participates in a web site by opening a web site, participating the site by selecting one or a plurality of layers among a plurality of layers which are published, conducting information exchange by clicking a tag of the layers, and attaching his or her own tag to the layers.

User B is defined as a user which obtains permission of a web site administrator, acquires the right of a layer by registering, generating a layer by himself or herself, establishes his or her own "three-dimensional space" therein, sets the rule of the layer by himself or herself, attaches a dedicated tag, actively dispatches information, seeks a wide range of interchange with other users, and at the same time, receives information.

That is, a plurality of User B has their own country (layer), and can conduct interchange and cooperative activity among nationals. User A is invited to a country which is created by a plurality of User B. However, User A does not have a country, and only visits the country created by user B and do shopping or deliver his or her opinions there.

User B becomes User A when he or she visits countries created by other User B.

In addition, there is a tag which is used exclusively by the nationals of User B country. That is, it is possible to allow everything to remain unpublished to visitors.

Then, a web administrator administrates both User A and User B. A web administrator gives the right of a layer to User B.

User A is given a right to attach a tag to a published layer, open a tag which has already been attached, and write and read information there.

User A arbitrarily selects a published layer which is displayed in such a manner that the viewpoint thereof is overlapped with that of a CV video image, makes an access to the layer by clicking by a mouse a tag in the layer to conduct information exchange or shopping there.

In addition, each user can freely attach a tag to an arbitral position on a layer or to a position in a designated area.

That is, users can open a file by designating and clicking by a mouse an arbitral tag in a CV video image displayed in their own user device 300, and can write information there. Here, the information as referred to herein may include all of text data, sound data, image data or the like to be treated by a computer.

By means of a tag with icon functions displayed in a CV video image, it is possible to read or write an appropriate file.

As mentioned above, using a CV tag is a medium, bi-directional communication is possible between a plurality of users and between a web site administrator and a plurality of users.

In addition, stores or firms can be arranged by CG or video mages in a layer in such a manner that the layer is overlapped with a CV video image.

A web site administrator and a user can arrange stores or office buildings on a layer overlapped with a CV video image as the doorway of bidirectional information.

As mentioned above, in this embodiment, information exchange is possible by a plurality of users developed mainly in a web site.

[Distributed Arrangement of a Server]

In the CV tag video image display device with layer generating and selecting functions according to one embodiment of the present invention, an explanation is made on a case in which a server storing a CV video image, layer information and map information is distributed to each user device.

In the one embodiment as mentioned above, the administrator device 200 is allowed to have a number of functions, and the user device 300 only serves to display an image as a viewer, whereby the terminal of the user device 300 has functions as low as possible. As a result, the CV tag technology of the present invention can be used by a wide range of unspecified number of general users (FIG. 15).

However, in order to realize the CV tag image display device provided with layer generating and selecting functions of the present invention, a web administrator has to provide enormous CV video image data in a server, and is required to update the data or to do other associated tasks. If an object of a CV video image relates to roads all over the country (or all over the world), in respect of video image updating and CV calculation, it is preferred that each data be administrated on the area-to-area basis, for example. The web environment differs according to the region, and there are some regions or environments where installation of a server is inappropriate.

Although the region or area where a server is actually installed is restricted, by distributing the data to an administrator device and a user device for administration and registration, a higher degree of efficiency can be attained as compared with the case where all data is centered to a single location.

Administration of a layer can also be distributed. Each layer can be administrated by a user himself or herself who sets the layer by their own user device.

In the ultimate case, it is possible to create a world where no distinction will exist between an administrator and a user and everybody is a user and everybody is an administrator. Users can also be classified into a user group which sets and administrates layers which require a higher degree of administration and a user group which browses and uses a CV video image which contains a layer.

FIG. 23 is an explanatory view which diagrammatically shows a configuration in which servers storing a CV video image, layer information and map information are distributed to each user device in the CV tag image display device provided with layer generating and selecting device according to the present invention.

In the CV tag video image display device 100 provided with layer generating and selecting functions shown in FIG. 23, in the server (administrator device 200) of a web site administer, the least minimum amount of data is allowed to be administrated.

Specifically, the server of a web site administrator (administrator device 200) does not have a motion picture. A web site administrator administrates CV value data base in which the CV value having the viewpoint information of a motion picture is corresponded to the entire image and the accounting data which is made on the assumption that use of certain contents is charged. Since this CV value data and the accounting data have a high degree of confidentiality, it is appropriate that these data base are provided in the web site administrator device.

The server of a web site administrator deals with a layer designation or inquiries from a user by owning ID data as a person who has the right of a layer.

In the case of a regional image server (user device 300), an administrator in charge of a certain region administrates the image of the region by his or her own server (user device 300) so that administration including updating of the motion picture thereof can be conducted.

In addition, a contents server (user device 300) stores contents other than CV video images by separating other contents from CV video images, whereby it responds to the request by a general user device.

A map server (user device 300) is administrated by a server of a map company (user device 300) so that administration including updating of the map can be conducted.

A layer and text data, image data or CG contents provided on the layer are administrated by a person who has the right of a layer, who starts up a server (user device 300) in its range of jurisdiction, and administrates the layer, data and CG contents with responsibility, while updating them.

Next, an explanation Will be made on the handling by a user in the above-mentioned server distribution system.

When a general user makes an access to a web site provided by the administrator device 200 through his or her user device 300, a desired region is displayed in a motion picture. A motion picture in an all-surrounding video image for introduction is displayed. In addition, on a web site screen, a layer he or she seeks can be arbitrarily selected.

In the common layer, a user sees a layer which has been prepared by a web administrator. Here, a web administrator also has a small number of common layers for administration.

Next, a user selects and displays a layer (world) in which he or she is interested by, for example, designating or clicking a tag.

The ID of all of the layers is stored in the server of a web administrator, an access is permitted to the server of a layer of a selected tag.

If it is a fee-charging layer (world), a user is charged at this stage.

Contents and data from the designated server are collected, whereby an intended screen is composed and displayed on the user device 300.

Although it is at user's freedom which is selected at first of an all-surrounding animated image and a layer, a layer is displayed in an overlapped manner with an all-surrounding video image of a region which a user prefers. That is, a layer is not directly visible, but is displayed in a manner in which CG or a three-dimensional video image on a layer is overlapped with an all-surrounding video image.

Finally, an explanation is made on an ultimate distributed system which is obtained by further developing the above-mentioned distributed system.

In the above-mentioned example, a web administrator and a user are present. An administrator and an administrator device are necessary for administrating a system, clarifying a person who is responsible for, managing an ID, charging or the like. However, this is not necessary in respect of system technology. If a user himself or herself performs system management, an administrator device can be operated by a user as part of the user device.

Then, it is fully possible to eliminate an administrator device, and to distribute all of the functions of conventional administrator devices to users and allow them to function. In the case of such a system, everybody can be a user, and user devices are distributed to a plurality of users, whereby the entire system is allowed to function.

A condition in which a user can select an arbitral layer is a parallel world as referred to in the present invention. A user can select, from a plurality of worlds (multiple worlds), a sole world which is suited to he or her. In addition, a user can add a new layer. As a result, a new world is added to a plurality of worlds. The world which has been added can be his or her world without publishing. Alternatively, the world which has been added can be published so that other users can select.

By selecting or adding a layer (world), economic activity in the layer or the common layer becomes possible. For example, in the layer (world) which has been selected or added, stores or firms specific to this layer are present. By clicking by a mouse CG-displayed stores or firms, a user is guided to contents including detailed images of these stores or firms. As a result, shopping, reservation or business transactions among companies can be conducted on the display.

Furthermore, it is possible to establish a web world bank in the common layer, and bank transaction in the layer world becomes possible.

In this way, by developing the CV tag video image display device provided with layer generating and selecting functions of the present invention, almost all transactions performed in the actual economic world can also be conducted in the web economic world. Issuance of currency usable in the web economic orbit or exchange of money or the like can also be possible.

According to the CV tag vide image display device of the present invention as mentioned above, the following various display functions (display means) are realized.

[Motion Image Lock-on Display]

A motion picture lock-on display is a function to fix and display an object to be administrated which has been selected and retrieved to a predetermined position of an image.

According to the lock-on display, once an arbitral object to be locked on is designated within an image, based on a camera vector obtained by CV calculation, an object which has been designated within an image is instrumented according to the actual coordinate system, thereby to obtain three-dimensional coordinates thereof. It is possible to control the position or posture of image display or a camera (a part to which a camera is fixed) so that an object to be designated of which the three-dimensional coordinates have been obtained is always displayed in the middle (or an arbitral predetermined position) of a picture frame.

As a result, the following is possible, for example. A three-dimensional coordinate system which coincides with an image is set within the image in advance. An intended object within an image is designated within the image by means of a mouse or the like. Then, an approximate three-dimensional coordinates of an intended object is obtained by CV calculation. The position at which an image is displayed can be controlled such that the so-obtained three-dimensional coordinates of an intended object always comes to the designated position of the image.

Alternatively, a camera can be controlled such that an intended object is always displayed at the designated position in an image.

Due to this lock-on function, by directly designating a CV tag or an object in a CV video image map, the selected object to be administrated can always be displayed in the middle of an image. As a result, visual recognition and handling can be facilitated.

[Display of a Plurality of CV Video Images]

Display of a plurality of a CV video images is a function of displaying a plurality of CV video image maps differing in scale, integrating the coordinate system, and displaying the same CV tag on a plurality of CV video image maps.

As mentioned above, a CV tag may be composed of CG ions or may be composed of actual image ions. It is needless to say that simple CG having no icon functions can be displayed.

[Synchronized Display of Maps]

Synchronized display of maps is a function of simultaneously displaying a CV video image and a two-dimensional map and displaying a CV tag also on a two-dimensional map.

Since a CV tag originally has three-dimensional coordinates, it is easy to make a CV tag two dimensional.

[Real-Time CV Video Image Display]

The real time CV video image display is a function of displaying a CV tag of an object to be administrated which has been selected and retrieved in a real time CV video image as in the case of a CV video image map. This is an actual image at that point, and hence, is most realistic. Since calculation is conducted on the real-time basis, there may be restrictions in the processing.

[Actual Image Overlapping Display]

The actual image overlapping display is a function of showing a CV tag, guidance arrow CG, signboard CG or the like by synthesizing and overlapping, by means of a head mount display, a half mirror or the like, an object to be administrated, which has been selected and retrieved, with an object to be administrated in the real world which is observed from a moving vehicle or the like, without displaying it on a CV video image.

That is, according to this function, by optically synthesizing an actual image in the real world by means of a half mirror, a CV tag, guidance arrow CG, or signboard CG can be synthesized without using a CV video image.

Here, an image captured by a camera is not an image to see, but an image for obtaining a CV value. Even if a vehicle is vibrating, a CV value can be obtained by CV calculation, and a CV tag, guidance arrow CG or signboard CG can be displayed at a correct position which is synthesized by means of a half mirror.

For an observer, even though a vehicle is vibrating, a CV tag, guidance arrow CG or signboard CG can be observed stably at a position without deviation relative to an object to be administrated.

For clicking a tag, it is preferable to use a device capable of designating a point in a three-dimensional space, such as a light pen, a three-dimensional probe or the like.

[Sound Guidance Display]

The sound guidance display is a function of guiding by sound the contents of a CV tag of an object to be administrated which has been selected and retrieved. This is a function which is particularly required in a car navigation system.

All of the above-mentioned functions can be conducted. However, the CV tag video image display device of the present invention may have at least part of the above-mentioned functions.

[Classification of Applicable Fields of a CV Tag]

In the CV tag video image display device provided with layer generating and selecting functions of the present invention as mentioned above, a CV tag to be inputted and displayed in a CV video image/layer can be applicable in various fields.

Application examples of a CV tag are mentioned below.

By clicking a street lamp of a CV video image of an actual site, a street lamp in that site can be turned on and off.

In the case of a real-time CV video image of a flower garden, if drooping flowers are confirmed in a CV video image, a water sprinkler can be turned on.

Traffic signals, shutters of a building or the like can be controlled by a real-time CV video image, and the results can be confirmed visually. This technology cannot be conducted by an IC tag, and a world where traffic signals, shutters or the like are controlled by a CV tag is a world aimed by a ubiquitous society.

By clicking a bus stop in a real-time CV video image, a bus time schedule is displayed.

A damaged part of the pavement can be reported by indicating it by a CV tag.

Tenants can be recruited by attaching a tag to a building in a CV video image.

Reservation can be made by attaching a tag to a hotel in a CV video image.

Reservation can be made by opening a tag of a restaurant in a CV video image.

Records of an accident can be written in a road in a CV video image when a road accident occurs.

Relevant information can be sent from a road office to a road user by means of a CV tag on a road in a CV video image.

An object can be specified by a CV tag in a CV video image, information is dispatched from a guest to other guests.

A map and a CV video image are linked, the coordinates of a map and an aerial CV video image are allowed to coincide, an aerial video image and a ground video image are linked, a CV tag is attached to an aerial image, a CV tag in an aerial CV video image is switched to a CV tag in a ground CV video image, entrance can be made to a CV video image of the inside of a building to attach a CV tag to individual merchandise or an object of each floor, whereby these can be shared and handled by users.

[Classification of a CV Tag According to Field]

CV tag application can be classified as follows according to the field.

Road management: Attributes of an artificial structure and a natural object, traceability Public equipment: signs, indications, utility poles, telephone poles, roads, river, bridges, rail roads, stations, roadside trees, flower gardens, street lamps, road heating equipment, guard rail, curbstone, bus stops, harbor Private facilities: private signboards, houses, buildings, stores Construction sites, accident sites, merchandise costs PC: holder, icon Moving body: vehicles, cargoes, a person who entrances Things which change with time: traffic signals, crossing gates National objects: mountains, natural rivers, trees, roadside trees, rocks Switches: locking doors, turning light on, switching signals, switching railroads, home electric appliances Off-line processing: tag processing by a web, standalone, distribution by a web Specific examples of use include the following:

(1) Attach a CV tag as an information provider, and provide information to users after identifying a location by a CV video image and a CV tag.

(2) As an administrator of object facilities, identify a location by a CV video image and a CV tag as administration information, and utilize it as the administrator.

(3) As users who have the same object, identify a location by a CV video image and a CV tag, and share the CV tag to work in cooperation.

(4) As a potential user, identify a location by a CV video image and a CV tag, and utilize a CV tag for enrollment or inviting people to an event.

(5) As a civil, identify a location by a CV video image and a CV tag, and write a request or idea to a CV tag as a national.

(6) As an administrative office, dispatch information by identifying a location by a CV tag.

When a disaster occurs, information is provided by identifying a location by a CV video image and a CV tag.

When a fire breaks out or an incident occurs, information is provided by identifying a location by a CV video image and a CV tag.

When a building site is confirmed, information is provided by identifying a location by a CV video image and a CV tag.

(7) When used by a third party, a location is identified by a CV video image and a CV tag, and is used as an information medium like a notice board.

(8) As a relevant advertisement medium, a location is identified by a CV video image and a CV tag, and is used for advertisement.

(9) When used by a business person, a location is identified by a CV video image and a CV tag, and is used for business.

Land and buildings in real estates

Location, environment, interior, menu, and reservation in restaurants

Location, environment, guidance and reservation in hotels

Images of a location where a taxi is called and a location where a passenger gets off the taxi in taxi serves Simulation of construction sites and spectacles in general construction companies The CV tag image display device with layer generating and selecting functions of the present invention has been explained hereinabove with referring to a preferred embodiment. However, the CV tag image display device with layer generating and selecting functions of the present invention is not limited to the embodiment mentioned above, and it is needless to say various modifications are possible within the scope of the present invention.

In the above-mentioned embodiment, an explanation was given taking as an application example of the CV tag image display device with layer generating and selecting functions of the present invention a computer device for a web site which conducts sales of merchandises or advertisement of stores and firms through an internet, town guide, map information or the like. As mentioned above, the CV tag image display device with layer generating and selecting functions of the present invention can be applied to a wide range of fields in addition to those mentioned above. It is needless to say that the application, the method of using or the like of the CV tag image display device with layer generating and selecting functions of the present invention are not specifically restricted.

An environment under which an administrator device and a user device are connected is not limited to an internet, and any can be used, for example, a LAN, a WAN, a dedicated line or the like, insofar as it realizes data communication between an administrator device and a user device.

INDUSTRIAL APPLICABILITY

The present invention can be suitably used as a video image device which displays and updates images or maps provided by a web site which conducts sales of merchandises, advertisement of stores and firms, town guide, map information or the like, a car navigation device to be installed in a vehicle, or as a monitoring system of roads or rivers.

The invention claimed is:

1. A camera vector (CV) tag image display device having layer generating and selecting functions, comprising:
   an administrator device; and
   one or two or more user devices which are communicatably connected with the administrator device through a network, wherein
   the administrator device comprises a computer program product on a non-transitory computer readable medium including
   a CV video image storing means which stores a CV video image obtained by adding to a video image of an arbitrary object area a predetermined CV value obtained with an all-surrounding images taken by an all-surrounding video camera indicating three-dimensional values of a position and a posture of a camera during recording of the video image,
   a layer generating means which generates one or two or more layers which are to be overlapped with the CV video image and have the same coordinate system as coordinate system of the CV video image,
   a layer storing means which stores the layer after relating the layer to a corresponding CV video image,
   a CV tag inputting means which arranges a predetermined CV tag including an icon that is displayed in the CV video image on an arbitral position in an arbitral three-dimensional coordinates in a designated range of the layer, a CV tag storing means which stores, together with relevant information thereof, the CV tag which has been arranged for each layer, a CV tag detecting means which detects and extracts the CV tag which has been arranged for each layer or the relevant information thereof, and distributes the detected and extracted CV tag or the relevant information thereof to the user device, and an ID administrating means which administrates all of the CV video images, layers, CV tags and relevant information within the CV tag, selects data required by the user device, combines the data, and distributes the data to the user device or records the data in the user device, and the user device which is connected with the administer device through the network according to an inputting operation of a user interface comprises a display which displays a predetermined image, a CV video image selecting and displaying means which selects and receives a CV video image of a desired location among CV video images to be stored in the CV video image storing means of the administrator device and displays the selected and received CV video image on the display, a layer selecting and integrating means which causes the layer generating means of the administrator device to generate a desired layer, or from the layers stored in the layer storing means, selecting a desired layer from a plurality of layers corresponding to the CV video image which has been selected by the CV video image selecting and displaying means and receiving the generated and selected layer to integrate the coordinates of the generated layer generated with the layer generating means with the coordinates of the CV video image, a CV tag selecting and displaying means which selects a CV tag arranged on the layer which has been selected by the layer selecting and integrating means, and integrating the selected CV tag on the layer of which the coordinates are integrated, thereby displaying the CV tag on the display together with the CV image in a synthesized manner, and a tag information selecting and displaying means which designates the CV tag which is displayed in a synthesized manner with the CV video image and displays the CV tag on the display in such a manner that the relevant information of the CV tag can be edited, classified, integrated, retrieved, and deleted.

2. The CV tag image display device having layer generating and selecting functions according to claim 1, wherein
the administrator device further comprises
a two-dimensional map storing means which stores two-dimensional map corresponding to the CV video image stored in the CV video image storing means, and
the user device further comprises
a two-dimensional map display means which selects a desired two-dimensional map from the two-dimensional map storing means, receives the map and displays the map on the display and,
a camera position displaying means which displays a recording position of the corresponding CV video image and a camera moving direction on the two-dimensional map which is displayed on the display,
the CV video image selecting and displaying means selects and receives, from the CV video image storing means, a CV video image corresponding to an arbitral point which has been designated in the displayed two-dimensional map and allows displays the CV video image on the display.

3. The CV tag image display device having layer generating and selecting functions according to claim 2, wherein
the user device further comprises a storing means which stores, instead of the administrator device, part or all of prescribed information selected from the CV video image to be stored in the CV video image storing means of the administrator device, the CV tag and relevant information thereof to be stored in the CV tag storing means, layer information to be stored in the layer storing means, and a two-dimensional map information to be stored in the two-dimensional map storing means.

4. The CV tag image display device having layer generating and selecting functions according to claim 1, wherein
the administrator device further comprises a real-time image means which captures a real-time image corresponding to the CV video image stored in the CV video image storing means and synthesizing and displaying the real-time image in the corresponding CV video image displayed in the display.

5. The CV tag image display device having layer generating and selecting functions according to claim 1, wherein
the user device further comprises a storing means which stores, among the layer information to be stored in the layer storing means, layer information relating to a layer generated by the user device instead of the administrator device.

6. The CV tag image display device having layer generating and selecting functions according to claim 1, wherein
the CV video image storing means stores a plurality of CV video images taken for the same object area at different times.

7. The CV tag image display device having layer generating and selecting functions according to claim 1, wherein the CV value is calculated with
a feature point extraction processing automatically extracting a predetermined number of feature point from image data of all-surrounding image generated by a plurality of cameras,
a feature response processing automatically tracing the feature points extracted by the feature point extraction in each frame image of the all-surrounding image and calculating correlation between the frame image and another frame image, and
a camera vector processing calculating a three dimensional position coordinate of the feature points of which the correlation is calculated and calculating a camera vector value including the three dimensional position coordinate and a three dimensional rotational coordinate of a camera corresponding to the each frame image.

8. The CV tag image display device having layer generating and selecting functions according to claim 1, further comprising a CV calculation part, wherein the CV calculation part comprises
a feature point extracting part extracting a sufficient number of the feature points from motion picture data which are taken by the all-surrounding camera,
a feature point correspondence processing part tracing the feature points which are extracted from the feature point extracting part in each frame image, and
a camera vector calculating part obtaining a camera vector corresponding to each frame image from three-dimensional positional coordinates of the feature points of which the correspondence is obtained.

9. The CV tag image display device having layer generating and selecting functions according to claim 8, further comprising a difference minimizing part determining a camera position direction whose error is minimized by multiple calculations of the camera position and statistic calculation process such that a distribution of camera vector solution is minimized.

10. The CV tag image display device having layer generating and selecting functions according to claim 8, further comprising a three-dimensional information tracing part positioning the camera vector obtained with the camera vector calculating part as an approximate camera vector value and tracing partially three-dimensional information contained in a plurality of frame images along with images in adjacent frames based on three-dimensional information which is obtained sequentially as a part of image in later processes.

11. The CV tag image display device having layer generating and selecting functions according to claim 9, wherein the three-dimensional information is three-dimensional distribution of the feature points obtained with a three-dimensional assembly of points constituting a three-dimensional shape.

12. The CV tag image display device having layer generating and selecting functions according to claim 8, further comprising a high-accuracy camera vector calculating part generating and outputting a more accurate camera vector than the camera vector obtained in the camera vector calculating part.

13. The CV tag image display device having layer generating and selecting functions according to claim 8, wherein the CV calculation part calculates a three-dimensional vector and a three-axial rotation vector of the camera by extracting the sufficient number of the feature points and tracing the feature points in Epipolar geometry.

14. The CV tag image display device having layer generating and selecting functions according to claim 1, wherein the camera vector is a vector of six free degrees including positional coordinates X, Y, Z of the camera and rotational angles $\phi x$, $\phi y$, $\phi z$ of each coordinate.

* * * * *